US009228489B2

(12) United States Patent
Domit

(10) Patent No.: US 9,228,489 B2
(45) Date of Patent: Jan. 5, 2016

(54) ROTARY ENGINE WITH ROTATING PISTONS AND CYLINDERS

(71) Applicant: Antonio Domit, Mexico (MX)

(72) Inventor: Antonio Domit, Mexico (MX)

( * ) Notice: Subject to any disclaimer, the term of this patent is extended or adjusted under 35 U.S.C. 154(b) by 435 days.

(21) Appl. No.: 13/683,109

(22) Filed: Nov. 21, 2012

(65) Prior Publication Data

US 2013/0133613 A1    May 30, 2013

Related U.S. Application Data

(60) Provisional application No. 61/629,645, filed on Nov. 23, 2011.

(51) Int. Cl.
| F02B 53/00 | (2006.01) |
| F02B 53/04 | (2006.01) |
| F01C 1/07 | (2006.01) |
| F01C 9/00 | (2006.01) |
| F01C 1/00 | (2006.01) |
| F02B 53/02 | (2006.01) |
| F01C 1/077 | (2006.01) |
| F01C 21/18 | (2006.01) |
| F01C 21/04 | (2006.01) |

(52) U.S. Cl.
CPC .............. *F02B 53/04* (2013.01); *F01C 1/077* (2013.01); *F01C 21/18* (2013.01); *F02B 53/02* (2013.01); *F01C 21/04* (2013.01); *Y02T 10/17* (2013.01)

(58) Field of Classification Search
CPC .......... F02B 53/04; F02B 53/02; F01C 21/18; F01C 1/07; F01C 1/077; F01C 21/04; Y02T 10/17

USPC ............... 123/245, 241, 238, 18 R, 18 A; 418/34–38
IPC ................ F01C 1/42,1/07, 1/077; F04C 2/00, F04C 18/00
See application file for complete search history.

(56) References Cited

U.S. PATENT DOCUMENTS

| 3,952,708 A | 4/1976 | Burley |
| 4,319,551 A | 3/1982 | Rubinshtein |
| 4,655,695 A | 4/1987 | Bender |
| 4,664,078 A * | 5/1987 | Bender .................. 123/245 |
| 5,433,179 A | 7/1995 | Wittry |
| 5,645,027 A | 7/1997 | Esmailzadeh |
| 6,158,987 A * | 12/2000 | Raikamo .................. 418/34 |
| 6,247,444 B1 | 6/2001 | Parks |
| 6,289,867 B1 | 9/2001 | Free |
| 6,457,451 B1 | 10/2002 | Sakita |
| 6,668,787 B2 | 12/2003 | Masters |

(Continued)

*Primary Examiner* — Thai Ba Trieu
(74) *Attorney, Agent, or Firm* — Roger N. Chauza, PC

(57) ABSTRACT

An internal combustion engine having combustion chambers that rotate about a main shaft axis in a step-wise manner. A first and second rotors each have elongate pistons that are interdigitated so that when one rotor rotates with respect to the other rotor, some chambers between the interdigitated pistons are reduced in volume and other chambers are increased in volume. Respective one-way bearings connect the first and second rotors to the main shaft to incrementally rotate it. Fuel mixture and exhaust apparatus is connected to one end of the engine to feed a fuel mixture to the increasing-volume chambers and extract the exhaust from other decreasing-volume chambers. At the same time, yet other chambers are experiencing compression and ignition cycles. An oil pump is driven by the first and second rotors for circulating a lubricant from a reservoir, through the engine parts to be lubricated and then back to the reservoir to cool the lubricant.

33 Claims, 17 Drawing Sheets

(56) References Cited

U.S. PATENT DOCUMENTS

| | | |
|---|---|---|
| 6,739,307 B2 | 5/2004 | Morgado |
| 7,182,061 B2 | 2/2007 | Georgescu |
| 7,185,625 B1 | 3/2007 | Guan et al. |
| 7,222,601 B1 | 5/2007 | Kamenov |
| 7,255,086 B2 | 8/2007 | Kovalenko |
| 8,037,861 B2 | 10/2011 | Liang |
| 8,038,416 B2 | 10/2011 | Ono et al. |
| 8,210,151 B2 | 7/2012 | Drachko |
| 8,297,253 B2 | 10/2012 | Kurowski |
| 8,511,276 B2 | 8/2013 | Omori |

* cited by examiner

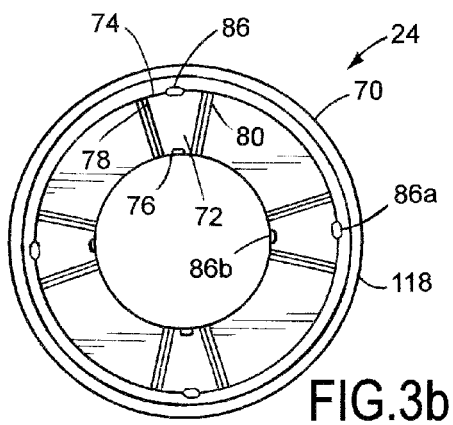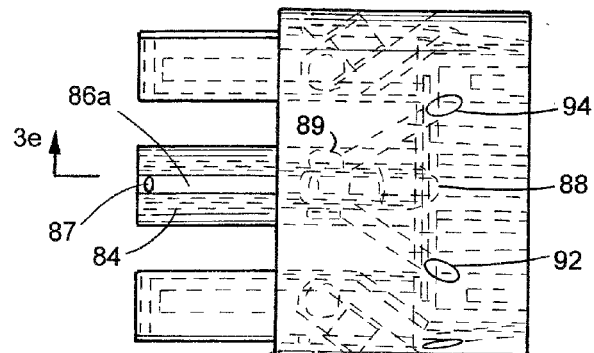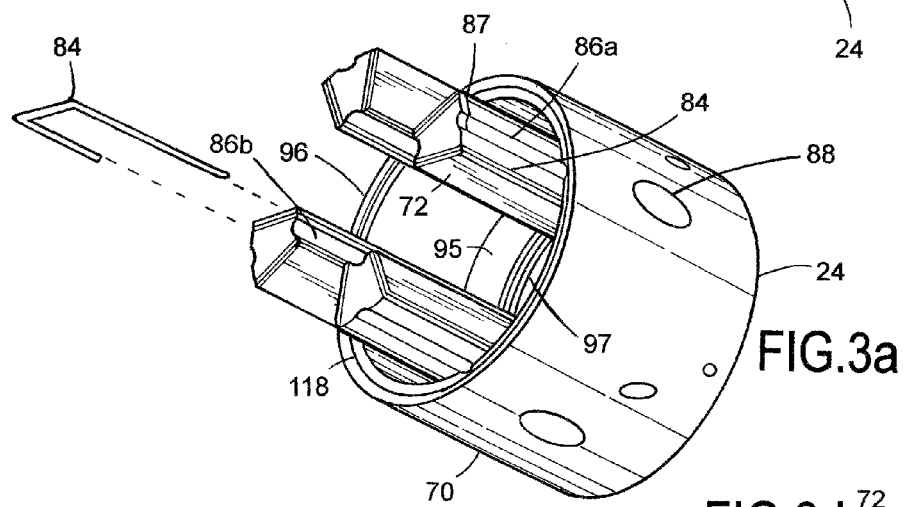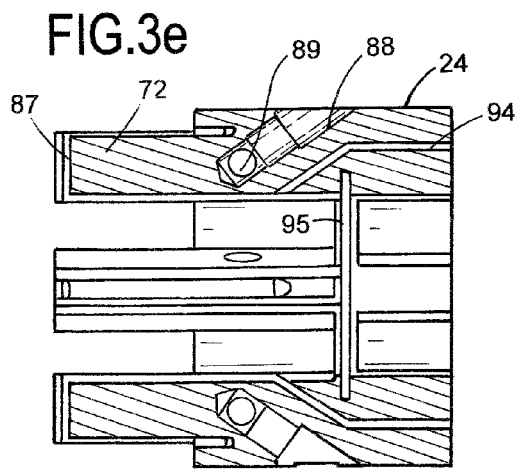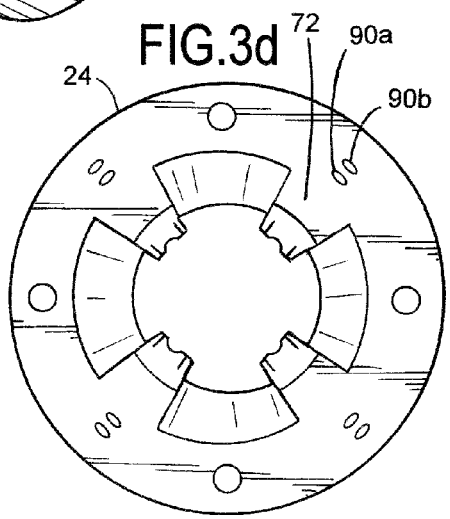
FIG.3b
FIG.3c
FIG.3a
FIG.3e
FIG.3d Microsoft Excel - TIEMPOS.xlsx

| A | B | C | D | E | F | G | H |
|---|---|---|---|---|---|---|---|
| CHAMBER | WALL | WALL | COLOR | | CHAMBER | WALL | WALL2 |
| 1 | 0 | 1 | | | | | |
| 2 | 1 | 2 | | | 6 | 5 | 6 |
| 3 | 2 | 3 | | | 7 | 6 | 7 |
| 4 | 3 | 4 | | | 8 | | 0 |
| STEP | ROTOR 24 | ANGLE | ROTOR 26 | ANGLE | DISC1 | | CHAMBER2 |
| 0 | FIXED | 0 | MOBILE | -30 A -60 | 60 A 30 | EXPLOSION | EXAUST |
| 1 | MOBILE | 0 A -30 | FIXED | -60 | 30 A 0 | EXAUST | ADMISION |
| 2 | FIXED | -30 | MOBILE | -60 A -90 | 0 A -30 | ADMISION | COMPRESSION |
| 3 | MOBILE | -30 A -60 | FIXED | -90 | | COMPRESSION | EXPLOSION |
| 4 | FIXED | -60 | MOBILE | -90 A -120 | | EXPLOSION | EXAUST |
| 5 | MOBILE | -60 A -90 | FIXED | -120 | -90 A -120 | EXAUST | ADMISION |
| 6 | FIXED | -90 | MOBILE | -120 A -150 | -120 A -150 | ADMISION | COMPRESSION |
| 7 | MOBILE | -90 A -120 | FIXED | -150 | -150 A -180 | CONPRESION | EXPLOSION |
| 8 | FIXED | -120 | MOBILE | -150 A -180 | -180 A -210 | EXPLOSION | EXAUST |
| 9 | MOBILE | -120 A -150 | FIXED | -180 | -210 A -240 | EXAUST | ADMISION |
| 10 | FIXED | -150 | MOBILE | -180 A -210 | -240 A -270 | ADMISION | COMPRESSION |
| 11 | MOBILE | -150 A -180 | FIXED | -210 | -270 A -300 | CONPRESION | EXPLOSION |
| 12 | FIXED | -180 | MOBILE | -210 A -240 | -300 A -330 | EXPLOSION | EXAUST |
| 13 | MOBILE | -180 A -210 | FIXED | -240 | -330 A -360 | EXAUST | ADMISION |
| 14 | FIXED | -210 | MOBILE | -240 A -270 | 0 A -30 | ADMISION | COMPRESSION |
| 15 | MOBILE | -210 A -240 | FIXED | -270 | -30 A -60 | COMPRESSION | EXPLOSION |
| 16 | FIXED | -240 | MOBILE | -270 A -300 | -60 A -90 | EXPLOSION | EXAUST |
| 17 | MOBILE | -240 A -270 | FIXED | -300 | -90 A -120 | EXAUST | ADMISION |
| 18 | FIXED | -270 | MOBILE | -300 A -330 | -120 A -150 | ADMISION | COMPRESSION |
| 19 | MOBILE | -270 A -300 | FIXED | -330 | -150 A -180 | COMPRESSION | EXPLOSION |
| 20 | FIXED | -300 | MOBILE | -330 A -360 | -180 A -210 | EXPLOSION | EXAUST |
| 21 | MOBILE | -300 A -330 | FIXED | 0 | -210 A -240 | EXAUST | ADMISION |
| 22 | FIXED | -330 | MOBILE | 0 A -30 | -240 A -270 | ADMISION | COMPRESSION |
| 23 | MOBILE | -330 A -360 | FIXED | -30 | -270 A -300 | COMPRESSION | EXPLOSION |
| 24 | FIXED | 0 | MOBILE | -30 A -60 | -300 A -330 | EXPLOSION | EXAUST |

FIG.9a

| I | J | K | L | M | N | O |
|---|---|---|---|---|---|---|
| COLOR | | | | | | |
| | | | | | | |
| CHAMBER 3 | CHAMBER 4 | CHAMBER 5 | CHAMBER 6 | CHAMBER 7 | CHAMBER 8 | |
| ADMISION | COMPRESSION | EXPLOSION | EXAUST | ADMISION | COMPRESSION | |
| COMPRESSION | EXPLOSION | EXAUST | ADMISION | COMPRESSION | EXPLOSION | |
| EXPLOSION | EXAUST | ADMISION | COMPRESSION | EXPLOSION | EXAUST | |
| EXAUST | ADMISION | COMPRESSION | EXPLOSION | EXAUST | ADMISION | |
| ADMISION | COMPRESSION | EXPLOSION | EXAUST | ADMISION | COMPRESSION | |
| COMPRESSION | EXPLOSION | EXAUST | ADMISION | COMPRESSION | EXPLOSION | |
| EXPLOSION | EXAUST | ADMISION | COMPRESSION | EXPLOSION | EXAUST | |
| EXAUST | ADMISION | COMPRESSION | EXPLOSION | EXAUST | ADMISION | |
| ADMISION | COMPRESSION | EXPLOSION | EXAUST | ADMISION | COMPRESSION | |
| COMPRESSION | EXPLOSION | EXAUST | ADMISION | COMPRESSION | EXPLOSION | |
| EXPLOSION | EXAUST | ADMISION | COMPRESSION | EXPLOSION | EXAUST | |
| EXAUST | ADMISION | COMPRESSION | EXPLOSION | EXAUST | ADMISION | |
| ADMISION | COMPRESSION | EXPLOSION | EXAUST | ADMISION | COMPRESSION | |
| COMPRESSION | EXPLOSION | EXAUST | ADMISION | COMPRESSION | EXPLOSION | |
| EXPLOSION | EXAUST | ADMISION | COMPRESSION | EXPLOSION | EXAUST | |
| EXAUST | ADMISION | COMPRESSION | EXPLOSION | EXAUST | ADMISION | |
| ADMISION | COMPRESSION | EXPLOSION | EXAUST | ADMISION | COMPRESSION | |
| COMPRESSION | EXPLOSION | EXAUST | ADMISION | COMPRESSION | EXPLOSION | |
| EXPLOSION | EXAUST | ADMISION | COMPRESSION | EXPLOSION | EXAUST | |
| EXAUST | ADMISION | COMPRESSION | EXPLOSION | EXAUST | ADMISION | |
| ADMISION | COMPRESSION | EXPLOSION | EXAUST | ADMISION | COMPRESSION | |
| COMPRESSION | EXPLOSION | EXAUST | ADMISION | COMPRESSION | EXPLOSION | |
| EXPLOSION | EXAUST | ADMISION | COMPRESSION | EXPLOSION | EXAUST | |
| EXAUST | ADMISION | COMPRESSION | EXPLOSION | EXAUST | ADMISION | |
| ADMISION | COMPRESSION | EXPLOSION | EXAUST | ADMISION | COMPRESSION | |

FIG.9b

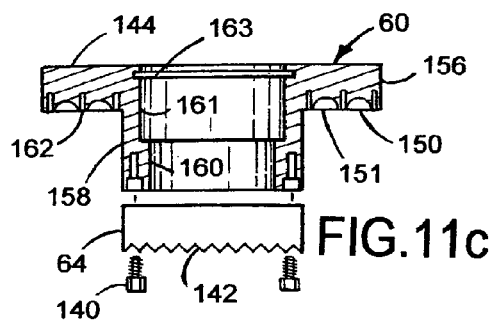
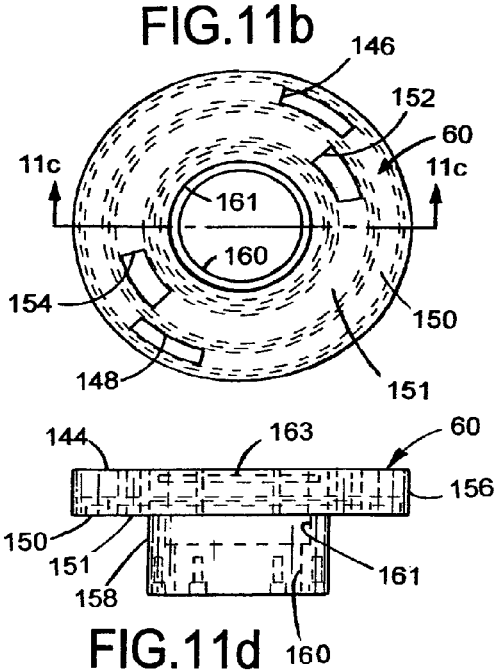
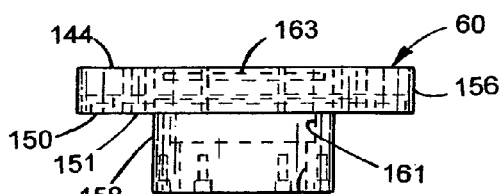
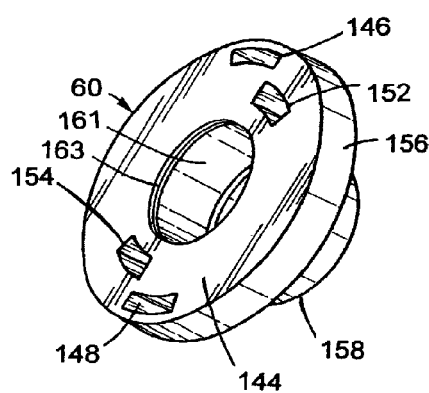
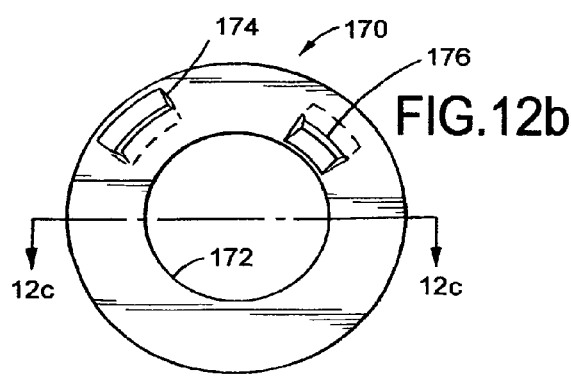
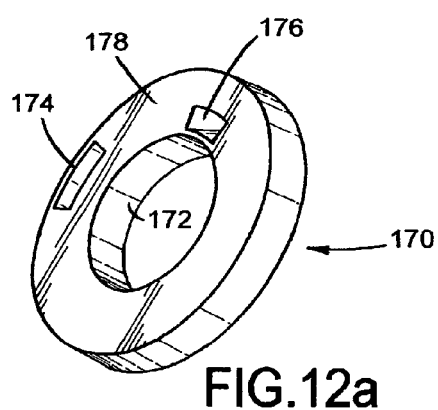
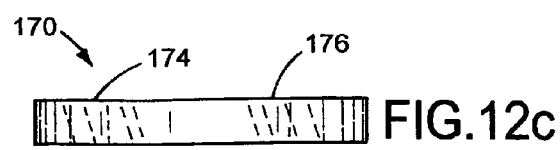

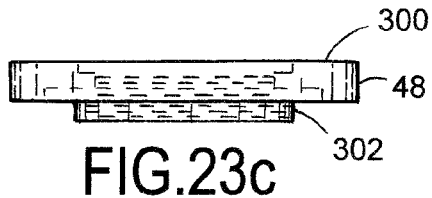
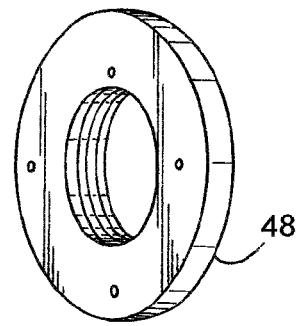
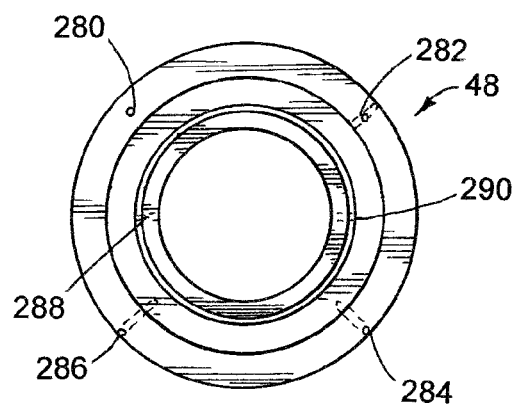
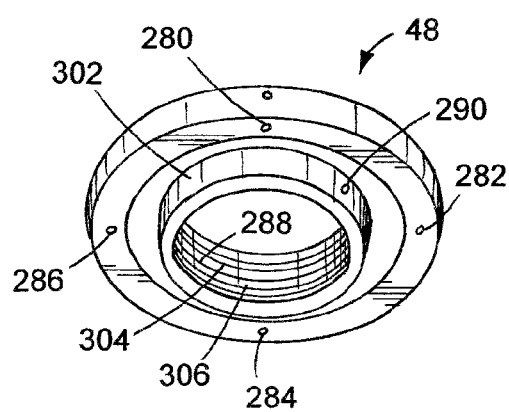
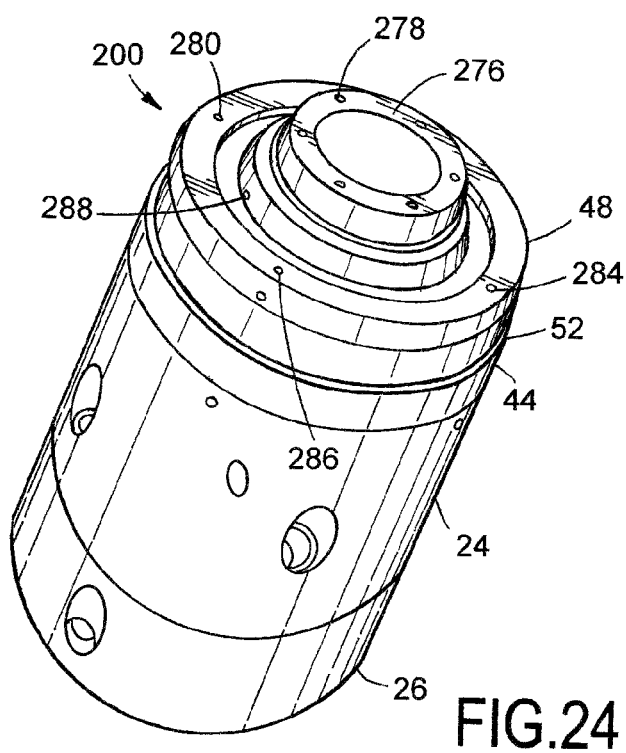

ROTARY ENGINE WITH ROTATING PISTONS AND CYLINDERS

RELATED APPLICATION

This U.S. non-provisional claims the benefit of U.S. provisional patent application Ser. No. 61/629,645 filed Nov. 23, 2011.

TECHNICAL FIELD OF THE INVENTION

The present invention relates in general to internal combustion engines, and more particularly to engines of the type that employ rotating pistons and cylinders.

BACKGROUND OF THE INVENTION

Internal combustion engines provide a vital component in the generation of torque for use in powering other mechanical machines and systems. An internal combustion engine generally uses gasoline, diesel, natural gas, etc., as a fuel to develop power. Conventional internal combustion engines operate with four cycles, namely an intake cycle, a compression cycle, a power cycle and an exhaust cycle. With this type of engine, a connecting rod has connected at one end thereof a piston that reciprocates in a cylinder. The other end of the connecting rod is connected to a crankshaft that rotates as the piston(s) reciprocate. The crankshaft is connected to a flywheel that maintains the rotary momentum of the engine.

During the intake cycle or stroke of the internal combustion engine, the piston moves downwardly in the cylinder to pull in the fuel mixture through an open intake valve. The crankshaft rotates so that the piston is moved upwardly during the compression cycle to compress the fuel mixture in the cylinder, with the intake and exhaust valves closed. The power cycle is carried out next as the ignition of the compressed fuel mixture by a spark plug causes the fuel to burn and expand. The expanding gasses of the burned fuel mixture cause the piston to move downwardly in the cylinder, during the power cycle. The next cycle is the exhaust cycle where the rotating crankshaft drives the piston upwardly while the exhaust valve is open to force the spent gasses out of the engine. Each of the four cycles is carried out during two revolutions of the crankshaft. The rotating crankshaft continues to rotate and carry out the four cycles again. This same sequence is carried out with internal combustion engines having one crankshaft and many connecting rods and pistons driven thereby. In multi-cylinder engines, each revolution of the crankshaft can involve various pistons that undergo a power cycle at the same time as other pistons are undergoing other cycles, thereby providing a smooth delivery of power to the crankshaft. Many one-cylinder engines are used on utility equipment, such as lawnmowers. Four-cylinder, six, eight, ten and twelve-cylinder engines are frequently used in automobiles to provide torque for driving the power train.

Other types of internal combustion engines are of the two-cycle type in which an intake, compression, power and exhaust stroke all occur in one revolution of the crankshaft. In this type of engine, while the crankshaft and flywheel carries the piston upwardly, the bottom side of the piston creates a vacuum in the crankcase and pulls fuel into the crankcase through an open intake port, and at the same time fuel in the combustion chamber is compressed. During this upward travel of the piston, an intake and compression cycle are carried out. A spark from a spark plug ignites the compressed fuel and drives the piston down during the power stroke. As the piston moves down in the cylinder, the fuel in the crankcase is compressed, and an exhaust port is opened. During the remainder of the down stroke of the piston, the fuel mixture in the crankcase escapes around the piston to the combustion chamber where the fuel mixture pushes the spent gases out of the exhaust port. Thus, during the downward travel of the piston, a power and exhaust cycle are carried out. As the crankshaft continues rotation to force the piston upwardly again, another intake and compression stroke are carried out.

Other variations of four cycle internal combustion engines includes the radial engine developed for high performance World War II aircraft. This type of engine is similar to the four-cycle engine described above, but differs in the manner in which the piston rods are connected to the crankshaft. The radial engine has cylinders arranged like spokes of a wheel around a crankshaft hub. The diesel engine is an internal combustion engine that operates with four cycles much like that described above, but ignites the diesel fuel mixture using compression to heat the fuel to the flash point, rather than using a spark plug.

The Wankel engine is an internal combustion engine, but does not utilize reciprocating pistons. Rather, the Wankle engine uses a rotating rotor that is triangular with bow-shaped sides. The rotor rotates in an oval-like epitrochoid-shaped housing to provide an intake location, a compression location, an ignition location and an exhaust location. The spaces of the four different locations change as the rotor rotates in the oval housing. For example, the volume between one bowed side of the triangular-shaped rotor and the housing decreases while being connected to the fuel mixture intake. Then, as the rotor continues to rotate, the captured fuel mixture is compressed as the volume decreases, and when finally compressed to the maximum extent the fuel mixture is ignited by a spark plug. Then, on further rotation of the rotor, the spent gasses are compressed in a volume that is coupled to an exhaust outlet of the engine. Each of the three sides of the triangular-shaped rotor operate together with the oval-shaped housing to effectively provide three cylinders.

A different type of internal combustion engine is disclosed in U.S. Pat. No. 6,739,307. This engine is constructed with a toroid-shaped cylinder with spaced-apart pistons that revolve in the annular-shaped cylinder. The engine block or covers in which the toroid-shaped cylinder is formed is stationary. Two sets of pistons are connected together by respective crank systems so that the sets of pistons move in the toroid-shaped cylinder independently of each other. The crank systems comprise a complicated arrangement of sun gears, connecting rods and crankshafts. The pistons move in a stepwise manner around the cylinder, i.e., one set of pistons are momentarily stationary while the other set of pistons move to thereby draw in a fuel mixture and compress it in some chambers or exhaust the spent gasses out of an exhaust port via other chambers. The combustion of the compressed fuel mixture then moves the one set of pistons while the other piston set is held momentarily stationary by the crank system. The crank system is mechanically complicated, as is other parts of the engine. The engine does not disclose a lubrication system nor a spark system to ignite a fuel mixture, but rather depends on the compression of the fuel mixture to ignite the same, much like a diesel engine.

From the foregoing, it can be seen that a need exists for a rotating combustion chamber type of engine that is less complicated and more easily constructed and thereby cost effective. Another need exists for an engine where the power producing components comprise two rotating rotors with interleaved pistons. A further need exists for a rotating combustion chamber engine that has a lubrication system that lubricates the rotating rotors, as well as a fuel delivery system that provides a fuel mixture to those rotating chambers that are carrying out an intake cycle. Yet another need exists for a rotating combustion engine that efficiently uses one-way bearings or other one-way rotation mechanisms to accomplish the stepwise rotational movement of the rotors.

SUMMARY OF THE INVENTION

In accordance with the principles and concepts of the invention, there is disclosed an engine that is of the type in which the pistons and cylinders revolve in a stepwise manner around a main shaft axis. The engine is equipped with a spark system to ignite the fuel mixture in combustion chambers at specified times. The engine also includes a lubrication system to not only lubricate the moving parts of the engine but to also cool the engine. When used to cool the engine, the lubricant circulates outside the engine to a reservoir and radiator cooler.

In accordance with one embodiment of the invention, the engine includes a pair of rotors that rotate in a stepwise manner. Each rotor is constructed with a housing having elongate pistons that extend in an axial direction of the main shaft, and the housings rotate with the respective rotors.

In accordance with another feature of the invention, each rotor is connected to the main shaft with respective one-way bearings or other one-way rotation mechanisms so that during an ignition or power cycle, one rotor remains momentarily stationary with respect to the other rotor and cannot rotate backwards, while the other rotor rotates a certain angular distance and carries with it the main shaft. The angular distance by which the moving rotor rotates is that distance which its pistons can move between the momentarily stationary pistons of the other rotor.

In accordance with another aspect of the invention, a fuel mixture and exhaust assembly operates at one axial end of the rotor pair to align a mixture/exhaust distributor with the moving cylinder chambers of the engine to assure that the fuel mixture is available to those cylinder chambers that are undergoing an intake cycle. Similarly, the mixture/exhaust distributor assures that the exhaust from other cylinder chambers can be expelled into an exhaust system during rotation of the rotors. According to one embodiment, the fuel mixture distributor rotates in a direction opposite the rotors, and at twice the rotational rate of the corresponding rotors.

In accordance with yet another feature of the invention, a lubrication system operates at the other axial end of the rotor pair to couple a lubricant to the moving engine components. The lubrication system includes a pump with impeller pistons which move within cylinder chambers of an impeller cover which covers the end of the rotor pair. During stepwise rotation of the rotor pairs, one rotor rotates the impeller pistons, and the other rotor rotates the impeller cover. The oil impeller pistons and the oil impeller thus move in a stepwise manner in synchronism with the rotors.

With regard to yet another feature of the invention, the lubrication system includes an oil distributor that rotates with the rotors to provide a ready supply of oil to the rotors as they rotate about the main shaft. Like the mixture/exhaust distributor, the oil distributor rotates in a direction opposite the rotors, and at twice the angular rate.

Another feature according to the invention is that four traditional internal combustion engine cycles are carried out, but there are at least two simultaneous intake cycles, two simultaneous compression cycles, two simultaneous ignition cycles and two simultaneous exhaust cycles. In addition, the two ignition cycles occur on oppositely-located cylinder chambers to thereby provide a balanced torque to the main shaft.

According to an embodiment of the invention, disclosed is an internal combustion engine that includes a main shaft rotatable about an axial axis, a first rotor for rotatably driving the main shaft, where the first rotor has a housing and plural pistons attached internal to the housing, and the pistons and the housing rotate about the axial axis. Also included is a second rotor for rotatably driving the main shaft, where the second rotor has a housing and plural pistons attached internal to the second housing, and the second rotor pistons and the second housing rotate about the axial axis. The pistons of the first rotor and the pistons of the second rotor are interdigitated to form chambers between the first rotor pistons and the second rotor pistons. The first rotor and the second rotor drive the main shaft in a step-wise manner where during rotation of the main shaft one rotor is momentarily stopped for a period of time and the other rotor rotates the main shaft during the same period of time. The fuel mixture is coupled to selected chambers and compressed, and ignited to produce a torque for rotating the main shaft of the engine.

According to another embodiment of the invention, disclosed is an internal combustion engine for driving a load. Included is a first one-way rotating mechanism and a second one-way rotating mechanism, where each one-way rotating mechanism is adapted for allowing rotation in one direction, but locks during attempted rotation in an opposite direction. A first rotor drives the main shaft using the first one-way rotating mechanism when in a locked condition to rotate the main shaft in only one direction. A second rotor drives the main shaft using the second one-way rotating mechanism when in a locked condition to rotate the main shaft in the same direction as the cylinder rotor. The first rotor and the second rotor have interleaving pistons that form a plurality of variable volume chambers therebetween during rotation of the main shaft. The chambers are for combustion of a fuel mixture to produce torque.

According to yet another embodiment of the invention, disclosed is an internal combustion engine having a main shaft, a hub rotor coupled to the main shaft for imparting a torque thereto during first ignition cycles of the engine. The hub rotor has finger-like pistons attached thereto and rotatable with the hub rotor. The hub rotor has a hub portion. A cylinder rotor is coupled to the main shaft for imparting a torque to the main shaft during second ignition cycles of the engine. The cylinder rotor has finger-like pistons attached thereto and rotatable with the cylinder rotor. The hub and cylinder rotors are rotatably connected together so that the finger-like pistons of the hub rotor are interleaved with the finger-like pistons of the cylinder rotor to form chambers therebetween. The finger-like pistons of the hub rotor incrementally rotate about the main shaft between respective adjacent finger-like pistons of the cylinder rotor, and the cylinder rotor incrementally rotates about the main shaft between respective adjacent finger-like pistons of the hub rotor. The hub rotor pistons are each movable in a respective cylinder chamber of the cylinder rotor. Each cylinder chamber has front and back sidewalls defined by respective angled side surfaces of adjacent cylinder rotor finger-like pistons, and each cylinder chamber has an arcuate top surface and an arcuate bottom surface.

According to a further embodiment of the invention, disclosed is an internal combustion engine having a rotatable main shaft, a fuel mixture and exhaust distributor, and a first rotor for rotatably driving the main shaft. The first rotor has a cylindrical-shaped housing and plural pistons extending radially inwardly from an internal surface of the first rotor housing toward an axial axis of the first rotor. The first rotor pistons rotate about the axial axis in concert with the first rotor housing. A second rotor rotatably drives the main shaft and has an outer cylindrical-shaped housing and an inner cylindrical-shaped hub. The second rotor has plural pistons extending radially inwardly from an internal surface of the second rotor housing to the hub, and the second rotor pistons rotate about the second rotor axial axis in concert with the second rotor housing. The pistons of the second rotor extend axially into the housing of the first rotor, and the pistons of the first rotor extend axially into the housing of the second rotor so that the pistons of the first and second rotors are interdigitated. A plurality of chambers are located between the pistons of the first rotor and the pistons of the second rotor. The chambers are rotatable with the first and second rotors. An oil pump has an impeller with pistons and also a cylinder member with cylinders. The pistons of the impeller are rotatably movable in respective cylinders of the cylinder member to draw a lubricant therein and to force the lubricant out of the cylinders to lubricate moving components of the engine. The oil pump is attached to a first end of the engine and rotatable with the first and second rotors. A fuel mixture and exhaust distributor is attached to a second end of the engine. The fuel mixture and exhaust distributor operably rotates so that fuel mixture ports of the fuel mixture and exhaust distributor maintain alignment with chambers of the engine undergoing respective INtake cycles. The fuel mixture and exhaust distributor also operably rotates so that exhaust ports of the fuel mixture and exhaust distributor maintain alignment with chambers of the engine undergoing respective EXhaust cycles.

According to yet another embodiment of the invention, disclosed is a method of operating an internal combustion engine. The method includes rotating a first engine rotor so as to drive a main shaft, and rotating a second engine rotor so as to also drive the main shaft. IN, EX, COMP and IG cycles are carried out in different chambers between interdigitated pistons attached to the first and second engine rotors, where a first set of pistons is attached to the first engine rotor and a second set of pistons is attached to the second engine rotor. The first engine rotor is rotated to impart torque to the main shaft during an IG cycle occurring in at least two of the chambers, and rotation of the second engine rotor is prevented during rotation of the first engine rotor. The second engine rotor is rotated to impart torque to the main shaft during an IG cycle occurring in at least two of the chambers, and rotation of the first engine rotor is prevented during rotation of the second engine rotor. The main shaft is alternately rotated by the first and second engine rotors so that the main shaft rotates at twice an angular rate of rotation of either the first or second engine rotors.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, functions or elements throughout the views, and in which:

FIGS. 3a-3e are respective isometric, left end, side, right end and sectional views of the cylinder rotor of the engine;

FIG. 6a illustrates the position of the moving hub rotor with respect to the momentarily stationary cylinder rotor near the start of a cycle;

FIG. 6b illustrates the position of the moving hub rotor with respect to the momentarily stationary cylinder rotor near the end of the cycle illustrated in FIG. 6a;

FIG. 7a illustrates the position of the moving cylinder rotor with respect to the momentarily stationary hub rotor near the start of a cycle;

FIG. 7b illustrates the position of the moving cylinder rotor with respect to the momentarily stationary hub rotor near the end of the cycle illustrated in FIG. 7a;

FIGS. 9a and 9b, when placed side by side, constitute a chart illustrating the relative positions of the cylinder rotor and the hub rotor during each thirty degree cycle for a full revolution, and the function of each of the cylinder chambers at such times;

FIGS. 11a-11d are respective isometric, end, side sectional and side views of the counter-rotating mixture/exhaust distributor, and associated components;

FIGS. 12a-12c are respective isometric, end, and top views of the stationary mixture inlet and exhaust outlet member;

FIGS. 23a-23d are respective isometric, right end, top and left end views of the inlet/outlet oil manifold;

FIG. 24 is an isometric view of the hub rotor, cylinder rotor, and the oil inlet/outlet components.

DETAILED DESCRIPTION OF THE INVENTION

Figure 1:
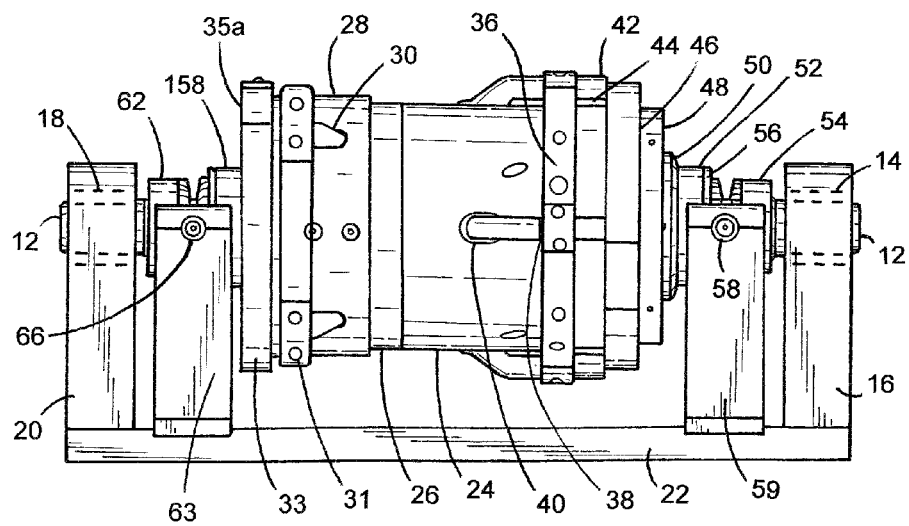
FIG. 1 is a side view of the internal combustion engine constructed according to one embodiment of the invention.
Figure 2:
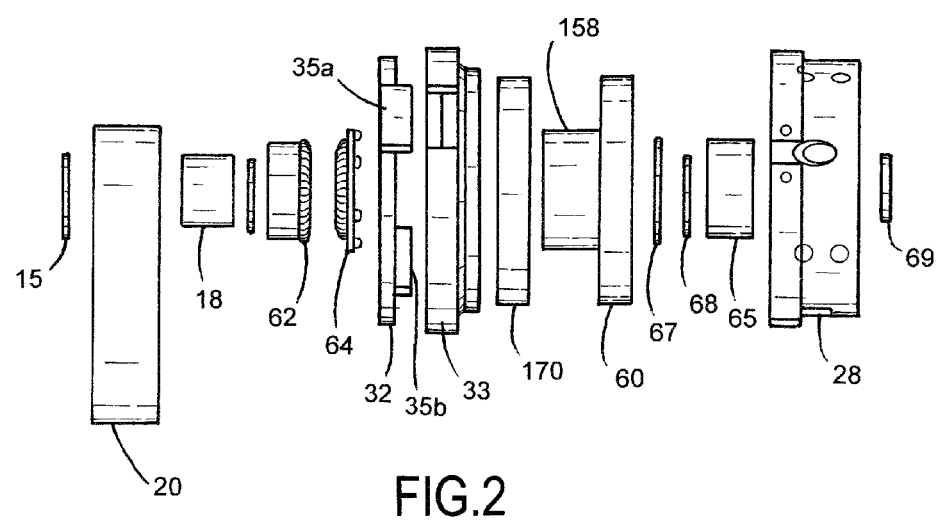
FIG. 2 is an exploded view of a portion of the components to the left of the engine of FIG. 1.

With reference to FIGS. 1 and 2, there is illustrated the internal combustion engine 10 according to one embodiment of the invention. The engine 10 can be of any size, but is generally cylindrical according to one construction, and is about three inches in diameter and about nine inches long. It is contemplated that the engine 10 will generate substantial shaft horsepower when using a standard grade of gasoline. It can be appreciated that with such a small size and comparatively large horsepower, the applications for the engine 10 are endless. The engine 10 can be used in automobiles, and even with one engine driving each of two or more drive wheels. The engine 10 has many other private, business, industrial and military applications.

For purposes of clarity, the engine 10 of FIGS. 1 and 2 does not have fuel mixture, exhaust, electrical or lubricant connections. The components of the engine 10 include a main shaft 12 that extends axially therethrough. One end of the main shaft 12 is supported in a one-way bearing 14 that is mounted in a support 16. The other end of the main shaft 12 is similarly supported in a one-way bearing 18 that is mounted in a second support 20. The one-way bearings 14 and 18 are conventional roller bearings, but are constructed to allow a shaft extended therethrough to rotate in only one direction. According to one embodiment, both end bearings 14 and 18 (one-way) can be of the type HF1616. Those skilled in the art may find it advantageous to employ other types of one-way rotation mechanisms. Each one-way bearing 14 and 18 is maintained axially registered with respective retaining rings 15 inserted into external annular slots formed in the respective ends of the main shaft 12. In order to fasten the bearings 14 and 18 in the supports 16 and 20, the peripheral edge of the outer races can be of a shape other than circular, such as square, hex, etc. A similar shaped bearing opening in the upright supports 16 and 20 would also be formed therein to accept such bearings 14 and 18. In the embodiment of FIGS. 1 and 2, the main shaft 12 is bearinged so that it rotates in a counterclockwise direction, as viewed from the front of the engine 10 (the right of drawing of FIG. 1). As will be appreciated by the description of the engine components, various components can be rearranged and/or reconfigured so that the engine 10 will rotate clockwise rather than counterclockwise. The supports 16 and 20 can be made integral through a base member 22. In practice, the main shaft 12 can be extended at either end and connected directly or indirectly to one or more loads. Indeed, respective loads can be connected to both ends of the main shaft 12. When employed in automotive applications, a clutch and standard transmission, or automatic transmission can be connected to one end of the engine, and one or more pulleys can be connected to the other main shaft end to drive power equipment such as an air conditioner, power steering pump, generator, etc. It is important to note that the engine 10 can produce substantial horsepower even at low rpm, so that in many applications a transmission is not necessary. It is expected that the engine 10 can produce sufficient power at $\frac{1}{48}$ rpm up to thousands of rpms.

The engine 10 includes a cylindrical-shaped cylinder rotor 24 and a cylindrical-shaped hub rotor 26, both of which have interdigitated or interleaved finger-like piston members that define cylinders and chambers. As will be described in more detail below, the cylinder rotor 24 is constructed with four "cylinders" that are arcuate shaped, each separated by a finger-like piston. Each cylinder is somewhat less than about thirty degrees of a circle. The hub rotor 26 is also constructed with four finger-shaped "pistons" mounted to a hub, where the pistons are each inserted into a cylinder of the cylinder rotor 24. The pistons of both the cylinder rotor 24 and hub rotor 26 are each constructed to be about thirty degrees of a circle. Thus, each piston of the hub rotor 26 can rotate in a short arc within its respective cylinder of the cylinder rotor 24, and form one chamber in front of each piston and a second chamber in the back of each piston. There is thus effectively four cylinders and eight chambers associated with the engine 10.

Two opposite-located pistons of the hub rotor 26 can move within respective cylinders of the cylinder rotor 24 to compress a gas mixture in the chambers in front of such pistons, and simultaneously draw in a new fuel mixture into the chambers behind such pistons. The other two pistons of the hub rotor 26 move within other respective cylinders of the cylinder rotor 24 to ignite the previously compressed fuel mixture in the chambers in front of such pistons, and to simultaneously expel the exhaust from the chambers located behind the other two pistons. When the fuel mixture is ignited in two of the chambers, the ignited fuel mixture moves one piston of one rotor away from the piston of the other rotor forming the chamber, thereby allowing the moving piston to cause counterclockwise rotation of the main shaft 12 due to the use of one-way bearings. The other piston would tend to rotate the main shaft 12 clockwise, but it can't because an anti-rotation assembly (FIG. 5) connected to the other piston prevents clockwise rotational movement thereof. Thus, the two rotors 24 and 26 alternately rotate on the main shaft 12 from momentarily stopped positions in a counterclockwise direction during the four internal combustion engine cycles. The term "momentarily stopped" means the piston is momentarily stopped relative to the other piston. Thus, in operation, each rotor is momentarily stopped while the other rotor is rotating thirty degrees, and then the opposite occurs, i.e., stepwise, thus providing a continuous torque to the main shaft 12. For every revolution of the main shaft 12, there are forty-eight power cycles.

During the stepwise rotation of the two rotors 24 and 26, other components of the engine 10 operate to allow a fuel mixture to be drawn into the cylinder chambers, allow the exit of the exhaust gasses from other cylinder chambers, provide an ignition spark to cylinder chambers in which a fuel mixture is compressed, and lubricate the rotating components of the engine 10. To that end, attached to and rotating with the hub rotor 26 is a high voltage cable holder 28 with a high voltage wire 30 that couples a spark to a spark plug (not shown in FIGS. 1 and 2). There are a total of four spark plugs mounted to the hub rotor 26, one for each of four cylinder chambers. A conductive spark distributor 34 distributes the spark to the correct number of spark plugs at the proper time. The spark distributor 34 is attached to an insulator ring 33, and both components are mounted around the counter-rotating fuel mixture/exhaust distributor 60. Similarly, with respect to the cylinder rotor 24, there is a high voltage cable holder 36 with high voltage wires 38 that couple the spark to respective spark plugs, one shown as numeral 40. High voltage connection parts 42 are located adjacent to the high voltage high voltage cable holder 36, and a high voltage insulator distributor 46 is adjacent to the high voltage connection parts 42. A conductive spark distributor 42 is attached to an insulator ring, and both components are mounted around the counter-rotating oil distributor 52. An inlet/outlet oil manifold 48 is connected to a source of lubricating oil, and is held axially registered by a retaining ring 50. A counter-rotating oil distributor 52 functions to properly distribute the lubricating oil to the rotating engine components.

Located on the right end of the engine 10 of FIG. 1, the counter-rotating oil distributor 52 is caused to rotate in a clockwise manner by a set of gears. A drive gear 54 is fixed to the main shaft 12 and thus rotates counterclockwise. A driven gear 56 is mounted to the oil distributor 52. A pair of diametric-located idler gears, one shown as numeral 58, are rotatable mounted in respective bearings, engage both the drive gear 54 and driven gear 56 so that the driven gear 56 rotates in a direction opposite that of the drive gear 54. The idler gears 58 are each mounted to a respective upright support 59.

Referring to the rear end (to the left in the drawing) of the engine 10, a counter-rotating fuel mixture/exhaust distributor 60 (FIG. 2) rotates to select the correct cylinder chambers to supply a fuel mixture thereto and extract exhaust gasses therefrom. The fuel mixture/exhaust distributor 60 rotates in a direction opposite that of the main shaft 12 by the utilization of a drive gear 62 that drives a driven gear 64 by way of a pair of diametric-located idler gears, one shown as numeral 66 (FIG. 1). The idler gears 66 are rotatably mounted in respective bearings. The idler gears 66 are each mounted to a respective upright supports 63. The counter-rotating fuel mixture/exhaust distributor 60 is mounted against a stationary mixture intake and exhaust outlet member 170. The stationary mixture intake and exhaust outlet member 170 is connected to a source of fuel mixture, and an exhaust pipe and muffler system. The fuel mixture/exhaust distributor 60 rotates on the main shaft 12 by a needle bearing 65. The needle bearing 65 is axially registered on the main shaft 12 by a pair of retaining rings 67 and 68. A spacer disc and ball bearing 69 are fastened to the main shaft 12 between the fuel mixture/exhaust distributor 60 and the hub rotor 26. With this arrangement, the fuel mixture/exhaust distributor 60 is held against the face of the hub rotor 26.

FIGS. 3*a*-3*e* illustrate the features of the cylinder rotor 24 and FIGS. 4*a*-4*d* illustrate the features of the hub rotor 26 which slides axially into the cylinder rotor 24 during installation of the engine 10. The cylinder rotor 24 and the hub rotor 26 can be constructed of a titanium or other suitable metal or other material capable of withstanding the stresses and heat generated by an internal combustion engine. The cylinder rotor 24 is constructed with a cylindrical housing 70 and four elongate finger-like pistons, one shown as numeral 72, the others being identically constructed. The individual finger-like pistons are identifies respectively as 72*a*, 72*b*, 72*c* and 72*d*. Cross-sectionally, the piston 72 is constructed so as to be generally pie shaped, with an arched or rounded top 74 and a truncated bottom surface 76. The bottom surface of each piston 72 is also arched or rounded upwardly. The two sides 78 and 80 (see FIG. 3*b*) are angled about thirty degrees. A pair of hardened metal U-shaped seal rings fit within respective U-shaped grooves formed around the piston 72. One seal ring is shown as numeral 84. The seal rings 84 are effective to seal corresponding surfaces of the pistons 72 to the top, bottom and end surfaces of the hub rotor 26. As noted above, the cylinder rotor 24 is rotatably mounted to the main shaft 12 by one or more one-way bearings to drive the main shaft 12 in only a counterclockwise direction. In practice, the cylinder rotor 24 has formed therein a bore in which the outer race of a one-way bearing is mounted. The cylinder rotor 24 is constructed with an end wall 95 having a central opening 97 therein through which the hub portion 104 of the hub rotor 26 extends. The opening 97 has formed therein internal annular grooves to accommodate seal rings to seal to the hub portion 104 of the hub rotor 26.

As illustrated in FIG. 3*e*, a spark plug (not shown) can be threadably inserted within a threaded hole 88 formed in the cylindrical housing 70. The electrode of the spark plug is coupled by a lateral opening 89 in the piston 72. The lateral opening 89 extends only from one side of the piston 72 and thus to only one combustion chamber of the engine 10. Each of the four pistons 72 are constructed in a similar manner with a spark plug that ignites a fuel mixture on one side of the piston. With the cylinder rotor 24 equipped with four spark plugs, there are four of the eight combustion chambers that can be ignited. As will be described below, the hub rotor 26 is equipped with four spark plugs and thus the other four combustion chambers can be ignited. With this arrangement, all eight chambers of the engine can be ignited in a timed manner to provide a smooth and balanced torque to the main shaft 12.

Formed in the top rounded surface 74 of each cylinder rotor piston 72 is an elongate axial oil groove 86*a*. A similar elongate axial oil groove 86*b* is formed in the bottom of each cylinder rotor piston 72. A through-hole 87 is formed near the end of the top oil groove 86*a*, radially through the piston 72, to a location near the end of the bottom oil groove 86*b*. FIG. 3*d* is an end view of the cylinder rotor 24 showing the lubricant inlet ports and outlet ports for each piston 72. The flow of the lubricant through the cylinder rotor 24 is as follows. The pressurized lubricant is forced into the oil port 90*a* formed in the end of the cylinder rotor 24, then through a circuitous internal channel (not shown) formed in the cylinder rotor 24, and then into the bottom oil groove 86*b*. The oil flowing in the bottom oil groove 86*b* lubricates the outer cylindrical surface of the hub 104 of the hub rotor 26, on which the bottom sections of the four cylinder rotor piston rings 84 engage. From the bottom oil groove 86*b*, the oil is forced upwardly through the through-hole 87 of the piston 72 to the top oil groove 86*a*. The oil flowing in the top oil groove 86*a* lubricates the part of the combustion cylinder formed by the inner cylindrical surface of the hub rotor housing 100. The radial ends of both seal rings 84 are lubricated by the oil that leaks or circulates around the end of the piston 72, between the radial ends of both seal rings 84 of the piston 72. It is noted that the top and bottom oil grooves 86*a* and 86*b* extend to the end of the respective pistons 72. The lubricant that is returned in the top oil groove 86*a* passes through a circuitous internal channel (not shown) and exits the cylinder rotor 24 via an exit oil port 90*b*. Each of the four pistons 72 of the cylinder rotor 24 are lubricated in the same manner. It is noted that the lubricant is fed to and returned from the cylinder rotor 24 by the counter-rotating oil distributor 52, against which the end face of the cylinder rotor 24 of FIG. 3*d* abuts. It is also noted that FIGS. 3*a* and 3*c* illustrate oil ports 92 and 94 formed in the cylindrical housing 70 that are part of the manufacture of the cylinder rotor to facilitate forming circuitous oil channels internal to the metal of the cylinder rotor 24. The surface openings 92 and 94 would be closed after forming the circuitous internal oil channels in the cylinder rotor 24.

With reference now to FIGS. 4*a*-4*d*, there is illustrated the hub rotor 26 having hub end portion that is inserted into the cylinder rotor 24 during installation. One end portion of the hub rotor 26 comprises a cylindrical housing 100, and the other end portion comprises the part of the hub 104 and pistons 102 that extend axially beyond the end of the housing 100. The hub rotor 26 is constructed with the cylindrical housing 100 of the same diameter as that of the cylinder rotor 24. Four pistons, one shown as numeral 102, are formed integral with a cylindrical hub 104 and the cylindrical housing 100. At the other end, each piston 102 is formed integral only with the hub 104. The cylindrical hub 104 is axially longer than the cylindrical housing 100. The space between neighbor pistons 102 and 110 comprises a cylinder in which one piston 72 of the cylinder rotor 24 is rotatable is a short arc. A cylinder chamber exists on each side of each piston 72, and the volume of such chambers varies as the cylinder rotor piston 72 moves between two hub rotor pistons 102 and 110, and vice versa. The arc subtended between the hub rotor pistons 102 and 110 is about thirty degrees, and the width or arc subtended by each hub rotor piston 102 is about thirty degrees. The piston 72 of the cylinder rotor 24 is movable in a short arcuate path between one face 106 of the hub rotor piston 102, and the face 108 of the neighbor hub rotor piston 110. As can be understood, the finger-like pistons of both the cylinder rotor 24 and the hub rotor 26 are interleaved. Each of the cylinders and pistons of the hub rotor 26 are constructed in an identical manner. The hub rotor 26 is rotatably mounted to the main shaft 12 by two one-way bearings to drive the main shaft 12 in only a counterclockwise direction. In practice, a one-way bearing is fixed within a first shouldered bore 98a of the hub rotor 26, and a second one-way bearing is mounted in a second shouldered bore 98b.

A respective spark plug is threaded into the cylindrical housing 100 in a threaded hole 116 that extends downwardly into each piston 102 of the hub rotor 26. The electrode of the spark plug is coupled by a lateral opening 117 in the piston 102. The lateral opening 117 extends only from one side of the piston 102 and thus to only one combustion chamber of the engine 10. With the hub rotor 26 equipped with four spark plugs, the other four of the eight combustion chambers can be ignited. With this overall cylinder and hub rotor arrangement, each combustion chamber on each side of each piston of the engine 10 can be fed a spark in a timed manner to ignite a compressed fuel mixture.

Figure 4A:
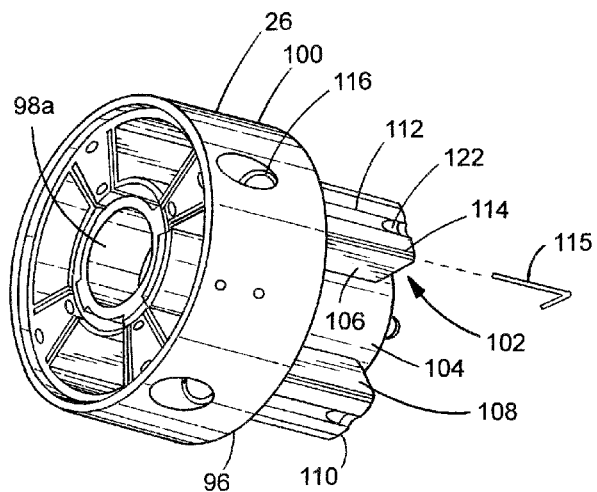
FIGS. 4a-4d are respective isometric, left end, top, and right end views of the hub rotor of the engine.
Figure 4B:
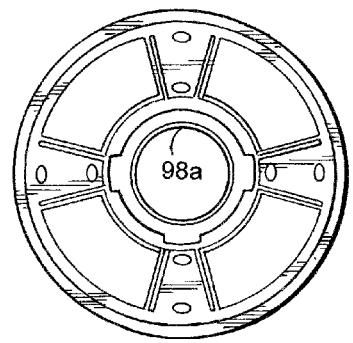
Figure 4C:
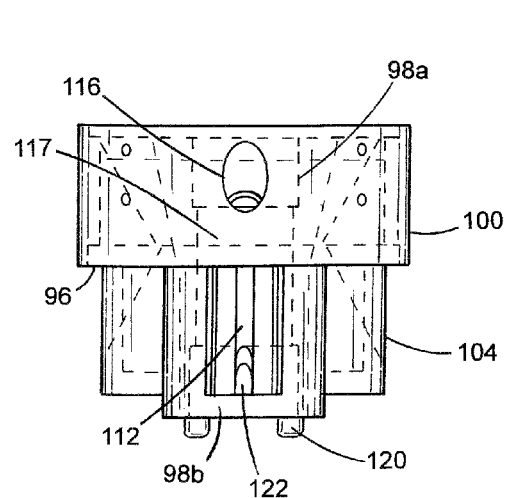
Figure 4D:
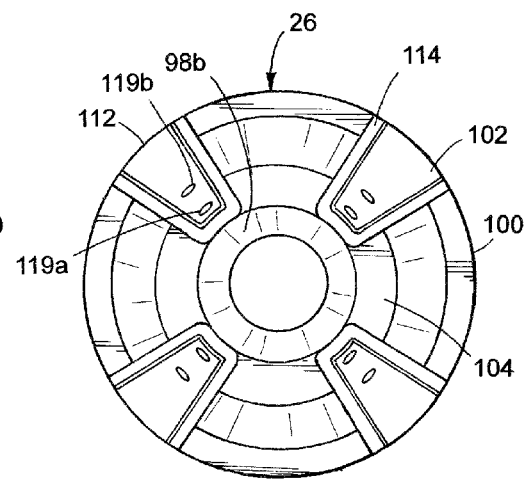

A pair of L-shaped seal ring grooves 114 is formed in each hub rotor piston 102. A metal L-shaped seal ring 115 is inserted in each seal ring groove 114 to provide a compression seal for compression chambers on each side of the pistons 102. In practice, the seal ring 115 can be constructed in multiple segments, where each segment is thinner and overlaps the other segment at the intersection. The intersection of the ring segments can be located at the corners of the ring groove 114. Each hub rotor piston 102 is constructed with an elongate axial top oil groove 112. A through-hole 122 is formed near the end of the top oil groove 112 radially through the piston 102, to a location internal to the hub 104. The through-hole 122 terminates in the hub 104 and is connected to an axial hole (not shown) to an oil inlet port 119a formed in the face end of the hub 104. FIG. 4d is an end view of the hub rotor 26 showing the lubricant inlet ports 119a and outlet ports 119b for each piston 102. The flow of the lubricant through the hub rotor 26 is as follows. The pressurized lubricant is forced into the oil inlet port 119a formed in the end of the hub 104 of the hub rotor 26, then through a circuitous internal channel (not shown) formed in the hub rotor 26, and then up the through-hole 122 into the top oil groove 112. The oil flowing into the top oil groove 112 lubricates the inner cylindrical surface of the housing 70 of the cylinder rotor 24, on which the top sections of the four hub rotor piston rings 115 engage. From the top oil groove 112, the oil is forced back to toward the face end of the hub 104 in an internal oil channel (not shown), and then out the oil outlet port 119b. The radial ends of both seal rings 115 of the piston 102 are lubricated by the oil that leaks or circulates around the end of the piston 102, between the radial ends of both seal rings 115. It is noted that the top oil groove 112 extends to the end of the respective pistons 102. Each of the four pistons 102 of the hub rotor 26 are lubricated in the same manner. It is noted that the lubricant is fed to and returned from the hub rotor 26 by the counter-rotating oil distributor 52, against which the end face of the hub 104 of the hub rotor 26 of FIG. 4d abuts.

When the hub rotor 26 is fully inserted into the cylinder rotor 24 so that one hub rotor piston 102 is located within each cylinder of the cylinder rotor 24, or vice versa, the cylindrical housing 70 of the cylinder rotor 24 and the cylindrical housing 100 of the hub rotor 26 fully cover each combustion cylinder. A seal ring (not shown) seals the annular edge 96 of the hub rotor 26 to the annular edge 118 of the cylinder rotor 24. As will be described below, a fuel mixture/exhaust distributor 60 seals the outer end (FIG. 4d) of the hub rotor 26, and an oil impeller cover 44 is sealed to the outer end (FIG. 3d) of the cylinder rotor 24. The lubricant is coupled from the counter-rotating oil distributor 52 (FIG. 20) through the oil impeller cover 44 (FIG. 19) and also through the oil impeller 202 (FIG. 17) to the inlet and outlet ports 119a and 119b of the hub end 104 of the hub rotor 26.

When the engine 10 is assembled, seal rings 115 are installed on the pistons 102 of the hub rotor 26 and the seal rings 84 are installed on the pistons 72 of the cylinder rotor 24. The hub rotor 26 is then inserted into the cylinder rotor 24 so that the pistons 102 and 72 are interleaved. Each cylinder chamber is bounded by one elongate sidewall of a cylinder rotor piston 72 and one elongate sidewall of a hub rotor piston 102, and the inner cylindrical surfaces of the cylindrical housings 70 and 100. The ends of the cylinder chambers are bounded by the oil impeller cover 44 and the fuel mixture/exhaust distributor 60. Each cylinder chamber varies in volume as a function of the stepwise rotational movement of rotors 24 and 26. In one embodiment, the axial length of each cylinder chamber is about 2.36 inches.

Figure 5B:
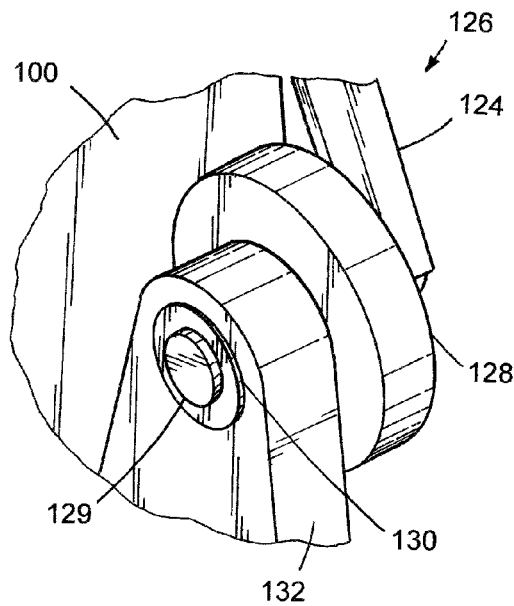
FIGS. 5a-5d illustrate various embodiments of anti-reverse rotation assemblies.
Figure 5A:
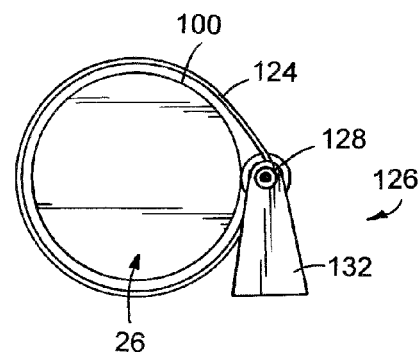

FIGS. 5a-5b illustrate an anti-reverse rotation assembly that locks the hub rotor 26 from reverse CW rotation during the stepwise CCW rotation of the cylinder rotor 24 during a power cycle. The anti-reverse rotation assembly is described below for use with the hub rotor 26, but the cylinder rotor 24 is also equipped with the same type of anti-rotation assembly. As noted above, the one-way rotor bearings are locked during CCW rotation of the rotors 24 and 26 to allow such rotors 24 and 26 to drive the main shaft in a CCW direction. While the hub rotor 26, for example, is undergoing a power cycle, the cylindrical housing 70 of the cylinder rotor 24 is held momentarily stationary by the anti-reverse rotation assembly, while the hub rotor housing 100 is allowed to rotate.

With regard to FIGS. 5a and 5b, the hub rotor 26 is illustrated with as friction band 124 that partially encircles the hub rotor housing 100. The friction band 124 is connected to an eccentric arrangement 126. The eccentric arrangement 126 includes a wheel 128 having a stub shaft 129 journaled in a regular bearing 130. The bearing 130 is anchored in an upright support 132 that is fastened to the engine base 22. One end of the friction band 124 is fastened to the wheel 128, and the other end of the friction band 124 is fastened to the stub shaft 129. With this arrangement, the friction band 124 is loosened when the hub rotor housing 100 rotates in the CCW direction, and is tightened when the hub rotor housing 100 rotates in the CW direction. The friction band 124 functions like an older style oil filter wrench that loosens or tightens on the filter depending on the direction the handle is turned.

The rotational operation of the hub rotor 26 with respect to the cylinder rotor 24 is carried out with the one-way bearings and the anti-reverse rotation assembly as follows. As an IGnition cycle is carried out in a chamber behind a hub rotor piston, the combustion force rotates the hub rotor 26 CCW against the locked one-way bearings of the hub rotor 26. The anti-reverse rotation assembly attached to the hub rotor housing 100 prevents it from rotating CW. The one-way bearing in the cylinder rotor 24 is not locked and thus allows the main shaft 12 to effectively rotate CW in the cylinder rotor 24. The anti-reverse rotation assembly of the cylinder rotor 24 allows rotation in the CCW direction. When an IGnition cycle occurs behind a cylinder rotor piston, the foregoing operation again occurs, but with regard to the other rotors.

Figure 5C:
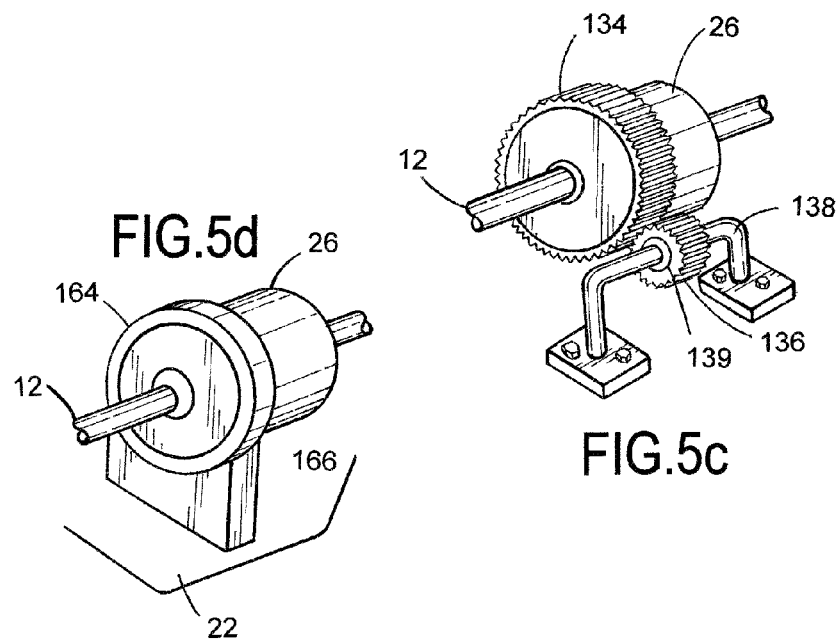

FIG. 5c illustrates another embodiment of an anti-reverse rotation assembly. The hub rotor 26 is attached to the main shaft 12 by a one-way bearing as described above. Here, a gear ring 134 is fastened around the hub rotor housing 100.

Figure 5D:
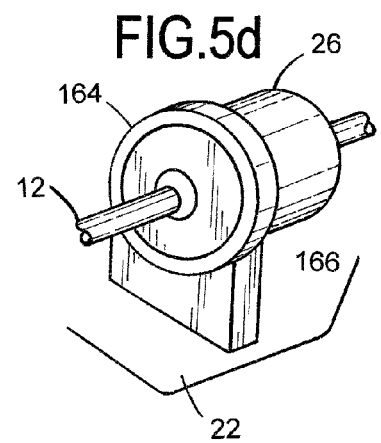

Another gear 136 is mounted to an upright support 138 by way of a one-way bearing 139. The upright support 138 is fixed to engine base 22. This anti-reverse rotation assembly allows the hub rotor 26 to rotate in one direction, but prevents rotation in the opposite direction. FIG. 5d illustrates yet another anti-reverse rotation assembly. The hub rotor 26 is attached to the main shaft 12 by a one-way bearing as described above. A large-diameter one-way bearing 164 has an inner race fastened to the outer circumference of the hub rotor housing. The outer race of the one-way bearing 164 is fastened to an upright support 166 attached to the base 22 of the engine 10. The one-way bearing 164 allows the hub rotor 26 to rotate in one direction, but not the other. Both the cylinder rotor 24 and the hub rotor 26 are equipped with some type of anti-reverse rotation assembly. Many other types and styles of rotor anti-reverse rotation schemes can be devised by those skilled in the art.

Figures 6A, 6B:
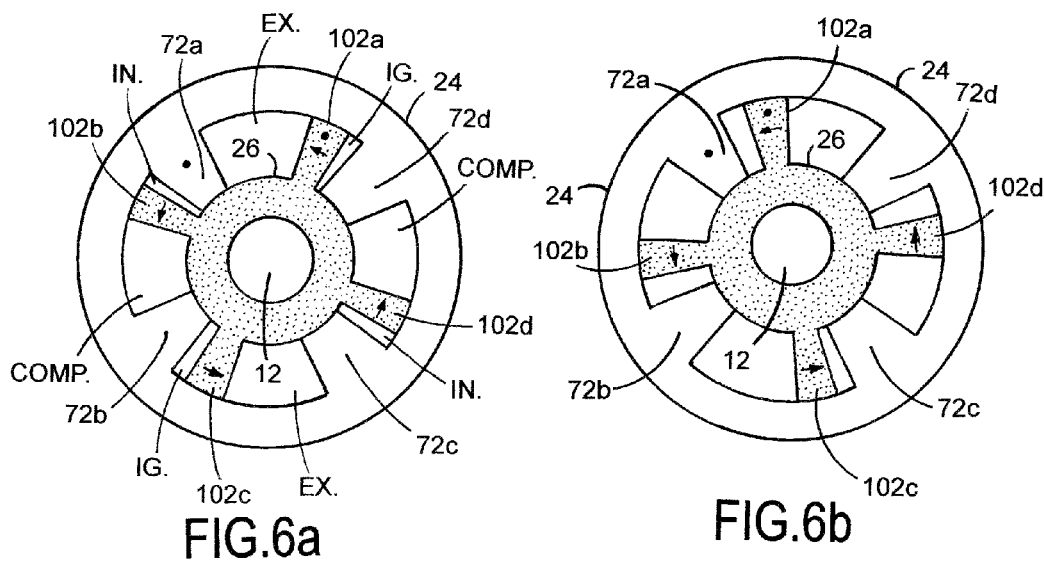
Figures 7A, 7B:
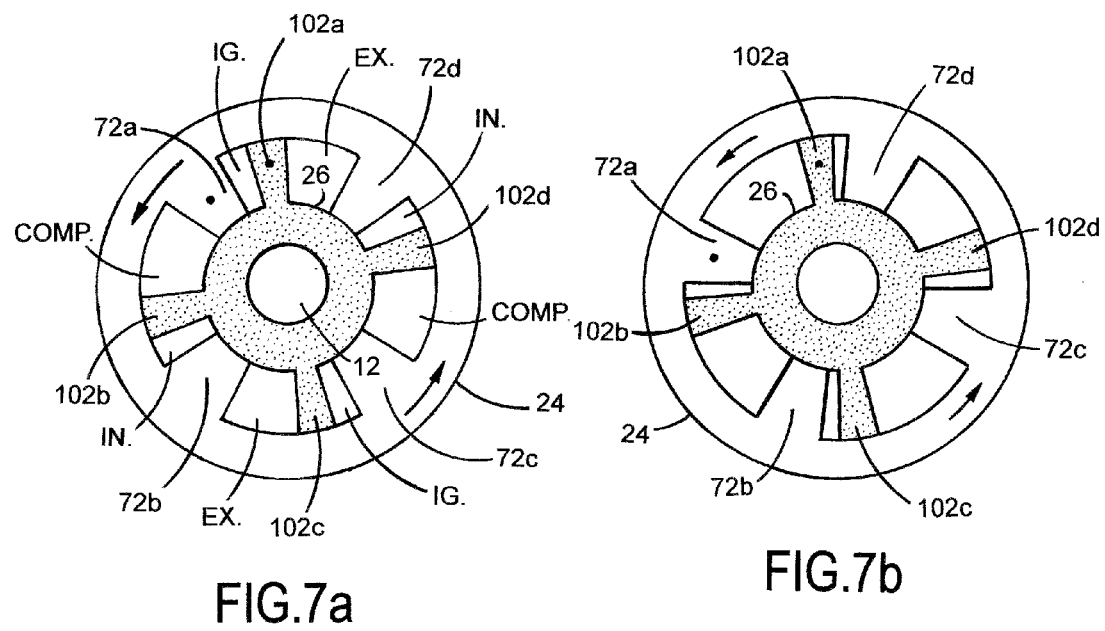
Figure 8A:
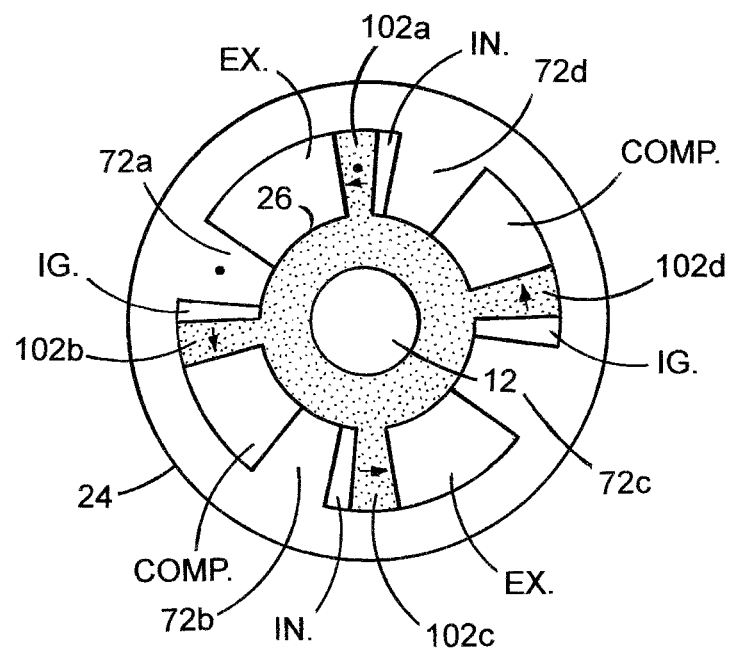
FIGS. 8a and 8b are further illustrations of the positions of the moving hub rotor with respect to the momentarily stationary cylinder rotor during the respective start and end of a cycle.
Figure 8B:
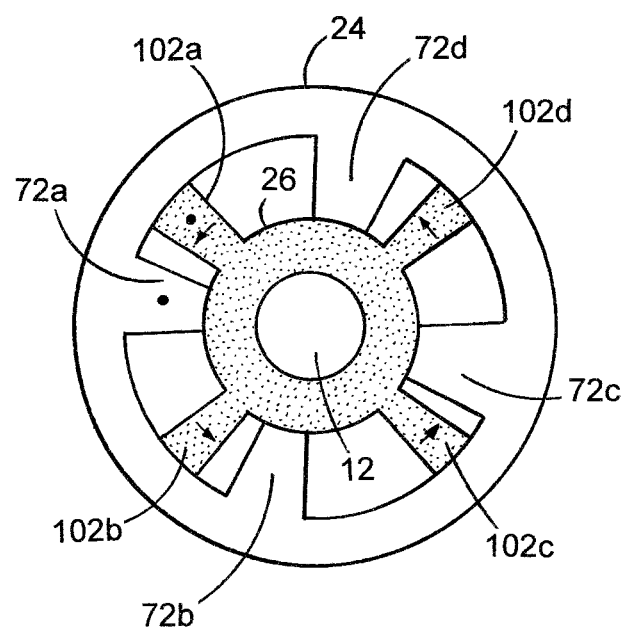

FIGS. 6, 7 and 8 are illustrations of the stepwise operation of the cylinder rotor 24 and the hub rotor 26. FIGS. 6a and 6b show the operation in which the first power stroke of the example causes the hub rotor 26 to be rotated counterclockwise while the cylinder rotor 24 remains momentarily stationary. In this power stroke, the ignition of the compressed fuel mixture occurs on the backside chambers of oppositely-located hub rotor pistons 102a and 102c. FIGS. 7a and 7b show the subsequent operation in which the second power stroke causes the cylinder rotor 24 to be rotated counterclockwise while the hub rotor 26 remains momentarily stationary. In this power stroke, the ignition of the compressed fuel mixtures occurs on the front side chambers of oppositely-located hub rotor pistons 102a and 102c. As noted above, both the cylinder rotor 24 and the hub rotor 26 can only rotate the main shaft counterclockwise, and not clockwise, due to the mounting thereof to the main shaft 12 by respective one-way bearings. In FIGS. 8a and 8b, the hub rotor 26 is again rotated in the third power stroke because the ignition of the compressed fuel mixture occurs on the backside chambers of the next set of oppositely-located hub rotor pistons 102b and 102d.

In more detail, FIG. 6a illustrates four hub rotor pistons 102a-102d. The piston 102a is marked with a dot in the drawing to easily identify the rotational position of the hub rotor 26. The four hub rotor pistons 102a-102d rotatably move within the respective four cylinders of the cylinder rotor 24. One cylinder of the engine 10, for example, is located between the cylinder rotor pistons 72a and 72b. One cylinder chamber thus exists, for example, in front of hub rotor piston 102b and another cylinder chamber exists behind the hub rotor piston 102b. With four hub rotor pistons 102a-102d movably disposed in four respective cylinders, there are a total of eight cylinder chambers in which each of the four internal combustion engine cycles can occur. The hub rotor piston 102a is in a position in which the chamber behind it is in an ignition (IG) cycle and the chamber in front of the piston 102a is in an exhaust (EX) cycle. The hub rotor piston 102a is forced counterclockwise, as shown by the arrow on the piston 102a. The combustion occurring in the chamber behind the hub rotor piston 102a also exerts a force on the wall of the cylinder rotor piston 72d, but it cannot rotate clockwise because it is locked by its anti-rotation assembly, whereupon the cylinder rotor 24 will not rotate clockwise. A similar operation occurs with respect to the oppositely-located hub rotor piston 102c in which an ignition IG cycle is occurring behind such piston 102c. The IG cycles both exert a counterclockwise force on the hub rotor 26. The oppositely-located but equal rotary forces occurring in two chambers results in a balanced force exerted on the hub rotor 26.

At this same time, the cylinder chamber in the back of the hub rotor piston 102b begins an intake (IN) cycle, as the volume of such chamber is increasing which thereby creates a vacuum to draw a fuel mixture therein. The cylinder chamber in front of the hub rotor piston 102b begins a compression (COMP) cycle to compress the fuel mixture previously drawn into such chamber. The same IN and COMP cycles are simultaneously occurring with the oppositely-located hub rotor piston 102d. FIG. 6b illustrates the cycles about to end, as were started and described above in connection with FIG. 6a. Here, the hub rotor 26 with its four pistons 102a-102d have rotated from one position in the respective cylinders to another position, while the cylinder rotor 24 remains momentarily stationary. During a single engine cycle, each hub rotor piston 102a-102d rotates about thirty degrees.

With regard to FIG. 7a, there is shown the next sequence in the rotary operation of the cylinder rotor 24 and the hub rotor 26. In this sequence of operations, there is an IG cycle occurring in the cylinder chamber located in front of the hub rotor piston 102a. This is in contrast to the operation of the engine 10 in FIG. 6a, where the IG cycle occurred in the back chamber of the hub rotor piston 102a. In any event, a simultaneous IG cycle occurs in the front chambers of both hub rotor pistons 102a and 102c to provide a balanced torque to the main shaft 12. However, since the combustion of the fuel mixture during the IG cycle cannot move the hub rotor pistons 102a and 102d clockwise, the cylinder rotor 24 now rotates counterclockwise. A dot is located on the cylinder rotor 24 to easily identify the movement thereof during the operation of the engine 10. In addition, the arrow on the cylinder rotor 24 illustrates that it is experiencing rotational movement, rather than the hub rotor 26. The cylinder chamber behind the hub rotor piston 102a experiences an EX cycle as the volume in such chamber is decreasing so that spent gases are forced out of the cylinder chamber. The cylinder chamber in front of the hub rotor piston 102b experiences an IN cycle as the volume therein is increasing to thereby draw in the fuel mixture, and the cylinder chamber behind the hub rotor piston 102b is experiencing a COMP cycle. The oppositely-located hub rotor piston 102d simultaneously experiences the same IN and COMP cycles as the hub rotor piston 102b. FIG. 7b illustrates the end of the cycles that were started in FIG. 7a. The cylinder rotor 24 substantially completes a thirty-degree rotational movement to advance the main shaft 12 correspondingly. It should be noted that during the two operations of FIGS. 6 and 7, each rotor 24 and 26 advances thirty degrees, thus advancing the main shaft 12 a total of sixty degrees.

FIG. 8a illustrates the next sequence in the operation of the engine 10. In this sequence, the hub rotor 26 now incrementally rotates while the cylinder rotor 24 is again momentarily stationary. An IG cycle is occurring in the cylinder chamber behind hub rotor piston 102b. This is because the previous two cycles in this cylinder chamber were respective IN and COMP cycles. An IG cycle is simultaneously occurring behind the oppositely-located hub rotor piston 102d. These two IG cycles in oppositely-located cylinder chambers provide a balanced torque on the hub rotor 26. Again, the cylinder rotor 24 cannot rotate clockwise due to the anti-rotation assembly, and thus is momentarily stationary. A COMP cycle is occurring in front of the hub rotor piston 102b, as the previous cycle in this chamber was an IN cycle. A COMP cycle is also occurring in the oppositely-located chamber in front of the hub rotor piston 102d. With regard to oppositely-located hub rotor pistons 102a and 102c, there is simultaneously occurring IN cycles behind the respective pistons, and EX cycles in front of such hub rotor pistons. FIG. 8b illustrates the positions of the hub rotor pistons 102a-102d with respect to the cylinders near the end of the sequence described in connection with FIG. 8a.

When the main shaft 12 has rotated twice (720 degrees), and each rotor 24 and 26 has rotated a single revolution, (360 degrees), a total of forty eight ignition (IG) cycles have occurred, with two ignition cycles occurring simultaneously in oppositely-located cylinder chambers. It can thus be appreciated that with forty eight ignition or power cycles occurring every full revolution of the rotors 24 and 26, a substantial amount of power can be developed. Also, because of the number of power strokes per engine revolution, no flywheel is required, and no transmission may be required.

The foregoing describes the operation of the engine 10 during the intake, exhaust, compression, and ignition cycles, it being assumed that the fuel mixture is coupled to the engine 10 during the INtake cycle, the exhaust is removed from the engine 10 during the EXhaust cycle, a spark is coupled to the spark plugs in a timed sequence during the IGnition cycle, and so on.

FIGS. 9a and 9b are a chart that shows the operation of the cylinder rotor 24 and the hub rotor 26 for each thirty degree cycle for a full revolution of the main shaft 12. On the left of the chart are the twenty four cycles where each cycle comprises thirty degrees, and the full twenty four cycles complete a single revolution of the main shaft 12. Column six of the chart illustrates the angular rotation of the main shaft 12 during the individual stepwise rotational movements of the cylinder rotor 24 and the hub rotor 26. With regard to cycle 0 of the chart, the cylinder rotor 24 remains momentarily stationary at zero degrees, while the hub rotor 26 moves from a thirty degree position to a sixty degree position. During the movement of the hub rotor 26, cylinder chamber #1 undergoes an IGnition cycle, cylinder chamber #2 undergoes an EXhaust cycle, cylinder chamber #3 undergoes an INtake cycle, cylinder chamber #4 undergoes a COMPression cycle, and cylinder chambers 5-8 repeat the same sequence of cycles. Accordingly, for a single thirty degree movement of the hub rotor 26, two IGnition cycles occur, two EXhaust cycles occur, two INtake cycles occur and two COMPression cycles occur. With regard to the next engine cycle, namely cycle 1, the hub rotor 26 remains momentarily stationary at the sixty degree position, while the cylinder rotor 24 rotates from zero degrees to thirty degrees. During the movement of the cylinder rotor 24, cylinder chamber #1 undergoes an EXhaust cycle as it previously experienced an IGnition cycle, cylinder chamber #2 undergoes an INtake cycle as it previously experienced an EXhaust cycle, cylinder chamber #3 undergoes a COMPression cycle as it previously experienced an INtake cycle, cylinder chamber #4 undergoes an IGnition cycle as it previously experienced a COMPression cycle, and cylinder chambers 5-8 repeat the same sequence of cycles. Accordingly, for a single thirty degree movement of the cylinder rotor 24, two IGnition cycles occur, two EXhaust cycles occur, two INtake cycles occur and two COMPression cycles occur. The other thirty-two cycles of the engine 10 undergo the same pair of INtake, COMPression, IGnition and EXhaust operations in different cylinder chambers to provide a total of forty-eight IGnition or power cycles during one revolution of the main shaft 12.

Figure 10:
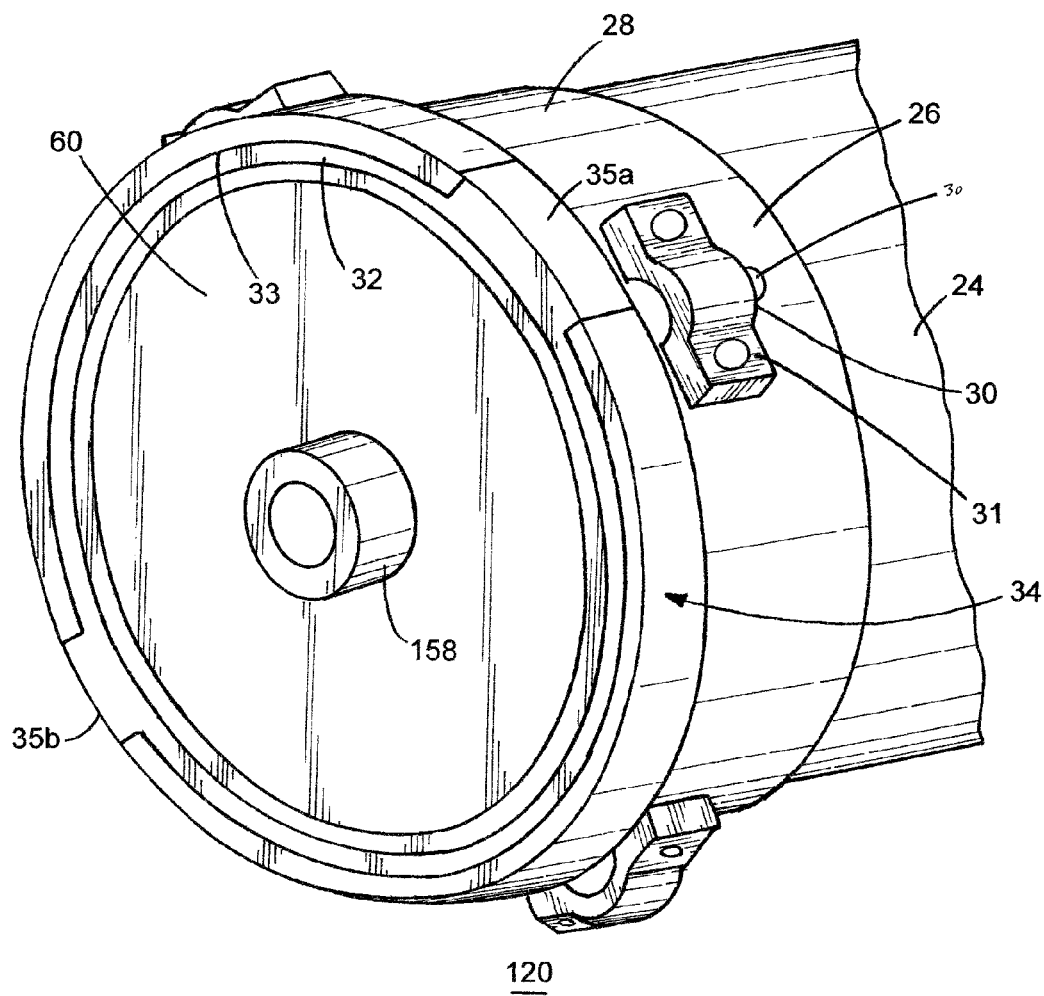
FIG. 10 is an isometric view of the electrical mechanism for coupling a high voltage spark to the spark plugs of the hub rotor.

FIG. 10 illustrates the spark delivery equipment 120 that couples the spark to the high voltage cables 30 of the rotating hub rotor 26. The spark delivery equipment 120 includes a high voltage cable holder 28 that is attached by bolts to the hub rotor 26 and rotates with it. The cable holder 28 includes four high voltage cables 30 that carry the timed spark to the spark plugs that are threaded into the hub rotor 26. There are four spark plugs in the hub rotor 26 and thus four high voltage cables 30. A cable hold-down clamp 31 clamps and anchors the cables 30 to the cable holder 28 so that the cable is not displaced outwardly during high rpm operation of the engine 10. A spark distributor 34 is fixed around the fuel mixture/exhaust distributor 60 and rotates with it, in a direction opposite the hub rotor 26. The spark distributor 34 is constructed of two parts, namely an annular metallic conductor 32 bonded within an insulator 33. The metallic conductor 32 is connected to a pair of oppositely-directed electrical contacts 35a and 35b.

An external spring-loaded electrical contact (not shown) is urged against the face of the rotating metallic conductor 32 to couple a source of timed spark to the spark distributor 34. The spark is then coupled via the metallic conductor 32 to both of the contacts 35a and 35b. The end of the high voltage cable 30 terminates in an assembly (not shown) that includes a spring-loaded electrical contact that is urged against the insulator 33 of the rotating spark distributor 34. The spring-loaded contact is connected to the high voltage conductor of the cable 30. As the spark distributor contact 35a rotates, it comes into contact with the spring-loaded contact connected to the cable 30 and thus conducts the spark to the hub rotor spark plug connected to the high voltage cable 30. Indeed, at this time a spark is distributed to both electrical contacts 35a and 35b. Since the contacts 35a and 35b are located at opposite positions on the spark distributor 34, the two oppositely-located chambers with a compressed fuel mixture therein are ignited.

Similarly constructed spark distribution equipment is associated with the cylinder rotor 24 and provides a timed spark in a similar manner. The spark distributor associated with the cylinder rotor 24 is attached or otherwise bonded to the peripheral surface of the counter-rotating oil distributor 52.

The spark can be generated by conventional external equipment, which may include a high voltage step-up coil and electrical ignition circuits similar to that known for use with common internal combustion engines. Such ignition circuits can be processor controlled to vary the timing of spark applied to the spark plugs as a function of many parameters, including load and RPM. Attached to the rotating rotors 24 and 26 can be magnetic, light or other sensors that detect the exact rotational position of the rotors 24 and 26. The rotor position information is supplied to the processor to control the time at which the spark is applied to the spark plugs.

The fuel mixture is coupled to the end of the hub rotor 26 and the exhaust is taken from the same end of the hub rotor 26 by the utilization of two components, namely a counter-rotating fuel mixture/exhaust distributor 60 of FIGS. 11a-11d, and a stationary mixture intake and exhaust outlet member 170 of FIGS. 12a-12c. The fuel mixture/exhaust distributor 60 is constructed with an annular plate 156 connected to a stub 158 having a bore 160 therethrough through which the main shaft 12 extends. A large diameter shouldered bore 161 functions to hold a bearing (not shown) so that the fuel mixture/exhaust distributor 60 can be rotatably mounted to the main shaft 12. An annular groove 163 is formed in the large diameter shouldered bore 161. The stub 158 has a driven gear 64 attached thereto by means of screws or bolts 140. The driven gear 64 has teeth 142 so that when driven, the fuel mixture/exhaust distributor 60 rotates therewith. As described above in FIG. 1, and as will be described in more detail below, the driven gear 64 is indirectly driven by the main shaft 12 to rotate the fuel mixture/exhaust distributor 60 in a direction opposite that of the cylinder rotor 24. A face portion 144 of the fuel mixture/exhaust distributor 60 is located inside the electrical spark distributor mechanism 120 and is sealed to the end of the hub rotor 26 by seals. The fuel mixture/exhaust distributor 60 is held against face of the hub rotor 26 with the arrangement described above in connection with FIG. 2.

The fuel mixture/exhaust distributor 60 is constructed with oppositely-located exhaust ports 146 and 148 formed in the face 144. Both exhaust ports 146 and 148 are coupled to an annular outer exhaust channel 150 formed on the other side of the fuel mixture/exhaust distributor 60. Similarly, oppositely-located fuel mixture intake ports 152 and 154 are formed in the face 144 and are coupled to an inner annular intake channel 151 formed on the other side of the fuel mixture/exhaust distributor 60. The exhaust port 146 is offset from the intake port 152 by about thirty degrees. Similarly, the exhaust port 148 is offset from the intake port 154 by about thirty degrees. Formed in the frontal part of the annular plate 156 are seal ring grooves with metal seal rings therein, one shown as numeral 162. The three seal rings 162 provide an annular seal around the exhaust channel 150 and around the intake channel 151.

FIGS. 12a-12c illustrate the structural details of the stationary mixture intake and exhaust outlet member 170. The mixture intake and exhaust outlet member 170 is constructed as an annular plate having a bore 172 for fitting onto the stub 158 of the fuel mixture/exhaust distributor 60. A single exhaust port 174 is formed through the member 170, as is a single mixture intake port 176. The exhaust port 174 is located radially in the member 170 a distance greater than the mixture intake port 176. The ports 174 and 176 are each formed through the thickness of the mixture intake and exhaust outlet member 170 at an angle, as shown in FIG. 12c. As described below, the ports 174 and 176 of the mixture intake and exhaust outlet member 170 mate with the annular channels 150 and 151 of the fuel mixture/exhaust distributor 60 of FIGS. 11c and 13.

Figure 13:
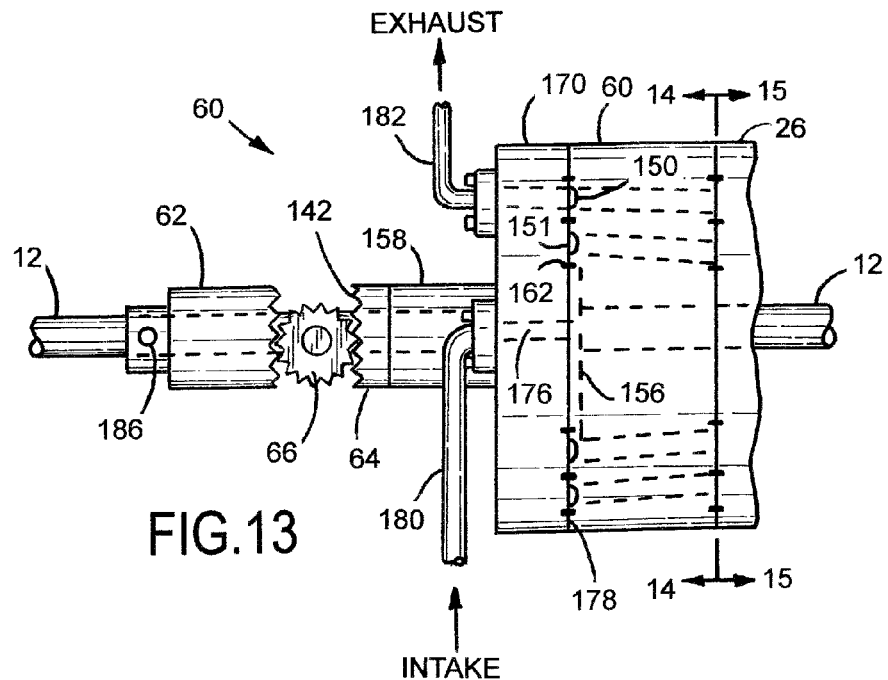
FIG. 13 is a side view of a portion of the engine illustrating the gear drive for the fuel mixture/exhaust distributor for distributing the fuel mixture and the exhaust to and from pairs of cylinder chambers during stepwise rotation of the cylinder and hub rotors.

With regard to FIG. 13, illustrated is the stationary mixture intake and exhaust outlet member 170 and the counter-rotating fuel mixture/exhaust distributor 60. The fuel mixture/exhaust distributor 60 is mounted to the main shaft 12 via a gearing arrangement and thus rotates whenever either of the rotors 24 or 26 rotate, but in an opposite direction to the rotors 24 and 26. The fuel mixture/exhaust distributor 60 is located between the face end of the hub rotor 26 and the stationary mixture intake and exhaust outlet member 170. A drive gear 62 is fixed to the main shaft 12 by a set screw 186 and/or a key. The drive gear 62 thus rotates with the main shaft 12. The drive gear 62 also rotates an idler gear 66 mounted to the upright support 63 (FIG. 1) on one side of the main shaft 12. While not shown, there is a similar idler gear mounted on the opposite side of the main shaft 12 so that the drive gear 62 rotates both idler gears 66. The idler gears 66 mate with teeth 142 of a driven gear 64 that is fastened to the fuel mixture/exhaust distributor 60 via the stub 158 (FIG. 11c). With this gearing arrangement, whenever the main shaft 12 rotates in a CCW direction, the fuel mixture/exhaust distributor 60 rotates in an opposite direction, namely a CW direction.

It should be understood that each time either the cylinder rotor 24 or the hub rotor 26 incrementally rotate, the fuel mixture and exhaust distributor 60 also rotates. Thus, when the cylinder rotor 24 rotates thirty degrees, the fuel mixture/exhaust distributor 60 rotates thirty degrees, and when the hub rotor 26 rotates thirty degrees, the fuel mixture/exhaust distributor 60 again rotates thirty degrees. The fuel mixture/exhaust distributor 60 therefore rotates at twice the rate as either the cylinder rotor 24 or the hub rotor 26. Stated another way, for every revolution of the cylinder rotor 24 (or the hub rotor 26), the fuel mixture/exhaust distributor 60 rotates two revolutions.

Figure 14:
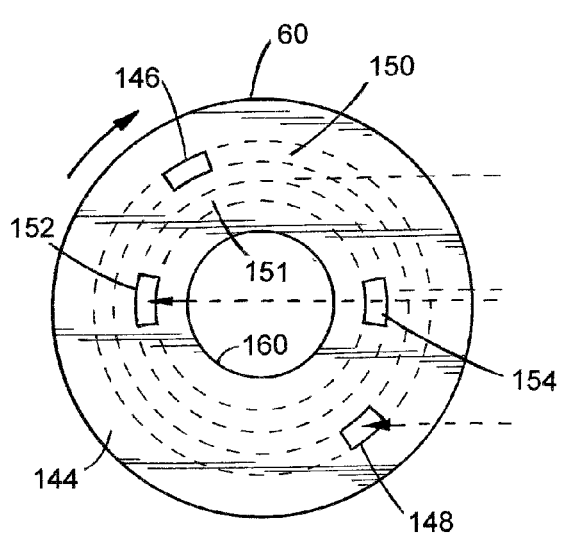
FIG. 14 is an end view of the face of the fuel mixture/exhaust distributor.
Figure 15:
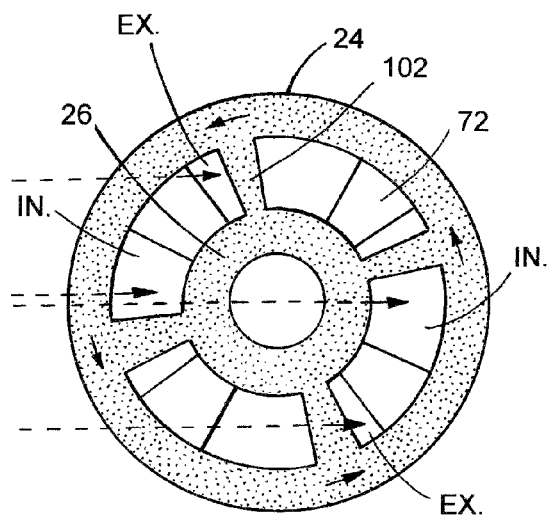
FIG. 15 is an end view of the face of the hub rotor that mates with the fuel mixture/exhaust distributor of FIG. 14.

The face 178 of the mixture intake and exhaust outlet member 170 is forced against the three annular seal rings 162 of the fuel mixture/exhaust distributor 60. When mated in the manner described, the fuel mixture that is coupled by the intake pipe 180 to the engine 10, is then coupled to the frontal face of the mixture intake and exhaust outlet member 170 to the intake port 176 (FIG. 12b). The fuel mixture is then coupled to the intake ports 152 and 154 of the fuel mixture/exhaust distributor 60 (FIGS. 11 and 14). From the intake ports 152 and 154, the fuel mixture is coupled to the inner annular channel 151 of the fuel mixture/exhaust distributor 60. As the fuel mixture/exhaust distributor 60 rotates CW, the intake ports 152 and 154 become aligned with the CCW rotating cylinder chambers that are expanding in volume (IN) to thereby draw the fuel mixture therein from the carburetor or fuel injection system of the engine 10. Similarly, the exhaust from the two cylinder chambers that are decreasing in volume (EX) is forced into the aligned exhaust ports 146 and 148 of the fuel mixture/exhaust distributor 60 and to the outer annular channel 150 on the other face of the fuel mixture/exhaust distributor 60. From the outer annular channel 150, the exhaust is forced through the exhaust port 174 of the mixture intake and exhaust outlet member 170 and to the exhaust pipe 182 of the engine 10.

FIG. 14 illustrates the face 144 of the fuel mixture/exhaust distributor 60 with the intake ports 152 and 154, as well as the exhaust ports 146 and 148. FIG. 14 illustrates the face of the cylinder rotor 24 and the hub rotor 26 and the chambers that are undergoing the IN and EX cycles. It is noted that when the faces of the engine components 60 and 26 are engaged together as shown in FIG. 13, the intake ports 152 and 154 are aligned with the chambers of the hub rotor 26 that are undergoing respective INtake cycles, and the exhaust ports 146 and 148 are aligned with the chambers that are undergoing respective EXhaust cycles. It is noted that there are twenty-four INtake cycles for each revolution of the main shaft, with two INtake cycles of the twenty-four occurring simultaneously. The EXhaust cycles are similarly carried out by the engine 10.

As can be appreciated from sequence of cycles illustrated in the chart of FIGS. 9a and 9b, the cylinder rotor 24 and the hub rotor 26 rotate in a stepwise manner in a counterclockwise direction. The relative positions of the intake and exhaust chambers of the engine 10, which change during operation of the engine 10, also effectively rotate, but in a clockwise direction. Thus, the fuel mixture/exhaust distributor 60 must rotate in a CW direction to maintain alignment with the intake and exhaust chambers of the engine 10 during CCW stepwise rotation of the cylinder rotor 24 and the hub rotor 26. When the hub rotor 26 rotates, it rotates with it (opposite direction) the fuel mixture/exhaust distributor 60 to align it with the ports of the cylinder rotor 24. Similarly, when the cylinder rotor 24 rotates, it rotates with it (opposite direction) the fuel mixture/exhaust distributor 60 to align it with the ports of the hub rotor 26. With regard to the chart of FIGS. 9a and 9b, it can be seen that the INtake operation of each cylinder occurs thirty degrees earlier in time for each of the cylinders. The same action occurs with respect to the EXhaust operations. Thus, as the cylinder rotor 24 and the hub rotor 26 rotate counterclockwise, the cylinders that undergo INtake and EXhaust operations effectively rotate at the same speed, but clockwise. With the cylinder rotor 24 and the hub rotor 26 rotating stepwise in a CCW direction for one revolution, the fuel mixture/exhaust distributor 60 rotates in the opposite direction, namely the CW direction, but at twice the speed to maintain alignment with the respective cylinder chambers undergoing the INtake and EXhaust operations.

The engine 10 includes many bearing surfaces to allow rotating surfaces to mate with one another. Such surfaces must be lubricated in order to reduce wear and allow the engine to experience a long life. In addition, the engine 10 is cooled by circulating a lubricating oil through numerous channels formed in the components, and especially the cylinder rotor 24 and the hub rotor 26 where the fuel mixture is burned. The combustion of the fuel mixture not only creates a substantial torque, but also creates heat that must be dissipated to maintain the engine components within specified operating limits.

Figure 16:
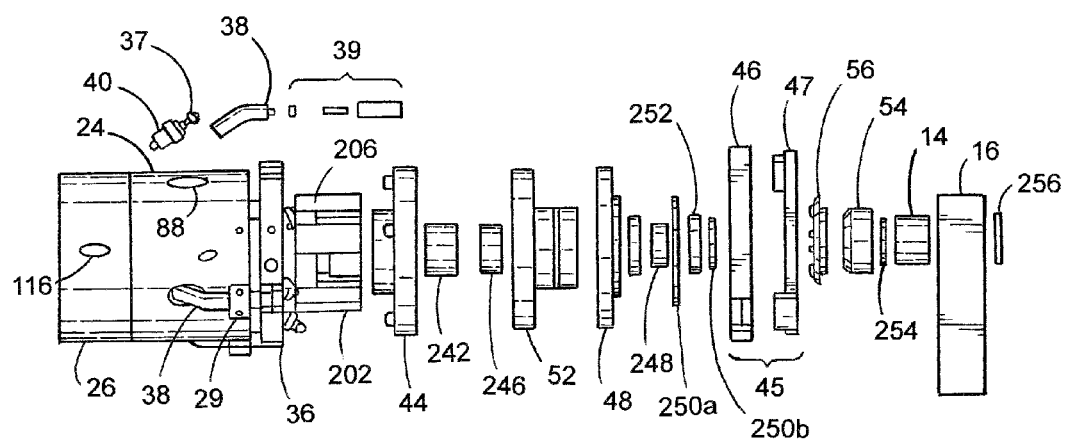
FIG. 16 is an exploded side view of the lubricating system of the engine.

FIG. 16 illustrates in exploded form the various components of the lubricating system of the engine 10. Various components of the electrical system that provides spark to the cylinder rotor 24 are also shown. The main shaft 12 that extends through many of the engine components is not shown for purposes of clarity. The cylinder rotor 24 includes four threaded spark plug holes 88, into which a respective spark plug 40 is threaded. Connectable to the exposed electrode of the spark plug 40 is a contact 37, a high voltage wire 38 and high voltage connection parts 39, including a tube and spring-loaded electrical contact. A cable holder 29 maintains the high voltage wire 38 constrained to the cylinder rotor 24 during high speed rotation. The high voltage wire 38 extends via the spring-loaded electrical contact to a spark distributor 45. The spark distributor 45 is constructed with an insulator 46, and an annular metallic conductor 47 with a pair of electrical contacts, as described above in connection with FIG. 10. An oil rotor or impeller 202 is fastened to the hub 104 of the hub rotor 26 and rotates with it. As noted above, the hub portion 104 of the hub rotor 26 extends through the cylinder rotor 24. The impeller pistons 206 of the oil impeller 202 operate within chambers 208 of the oil impeller cover 44. The oil impeller cover 44 is attached to the end of the cylinder rotor 24 and covers the oil impeller 202. The end wall 95 of the cylinder rotor 24 provides a divider between the combustion chambers of the engine 10 and the oil delivery system. A one-way bearing 242 is fastened within the central bore 231 of the oil impeller cover 44, and a spacer 246 abuts against the one-way bearing 242. The counter-rotating oil distributor 52 abuts against the oil impeller cover 44. A stationary inlet/outlet oil manifold 48 abuts against the oil distributor 52. A spacer 248 and retaining rings 250a and 250b are employed to maintain a one-way bearing 252 axially registered on the main shaft 12. The counter-rotating oil distributor 52 has fixed therein the one-way bearing 252. The oil distributor 52 is held against the cylinder rotor 24 with the retaining rings 250a and 250b and spacer 248 in the same manner as the fuel mixture/exhaust distributor 60 is held against the hub rotor 24 described above in connection with FIG. 2. As described above, the driven gear 56 is fastened to the end of the oil distributor 52, and the drive gear 54 is fastened to the main shaft 12. A pair of idler gears 58 (FIG. 1) mesh with the teeth of the gears 54 and 56 and drive the oil distributor 52 in a direction opposite to that of the main shall 12. The drive gear 54 is maintained axially spaced from the driven gear 56 by a retaining ring 254 located in an annular slot formed in the main shaft 12. The main shaft 12 is bearinged in the one-way bearing 14 which is press fit into the upright base member 16. A retaining ring 256 located in an annular slot in the main shaft 12 maintains the main shaft 12 axially registered between the upright base members 16 and 20.

Figure 17A:
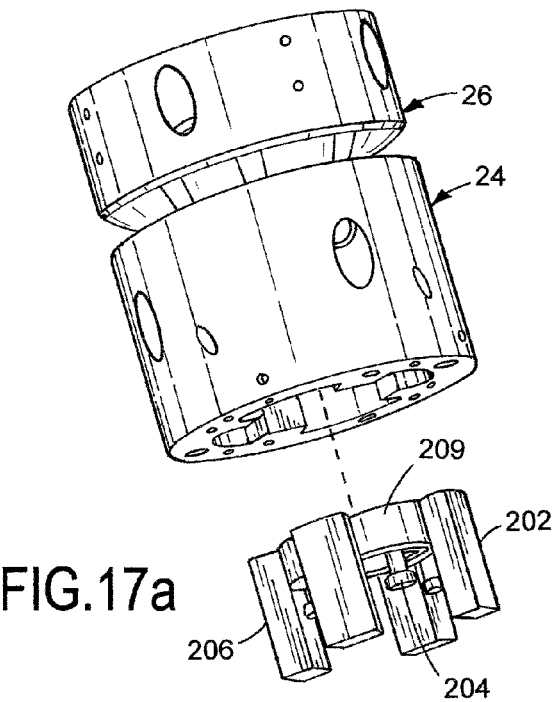
FIGS. 17a and 17b are respective exploded and isometric views of the oil distribution assembly.
Figure 17B:
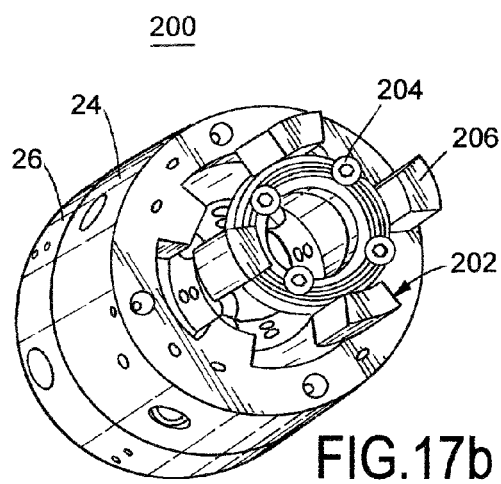

Referring now to FIGS. 17a and 17b, there is illustrated the oil distribution assembly 200 for coupling a lubricating oil to and from the engine 10 to lubricate the parts thereof. As will be described in more detail below, the oil that has circulated through the engine 10 is cooled by a cooling oil radiator 236 (FIG. 25) so that the engine 10 is not only lubricated but also cooled. Because the lubricating oil is cooled, there is no need for the use of water or other type of coolant to circulate through the engine 10 to remove heat therefrom. However, one skilled in the art may find that the engine 10 can be additionally cooled using water or other coolant circulating in various engine components, or by the use of air forced across the outside surfaces of the engine 10.

The hub rotor 26 extends through the cylinder rotor 24 and is coupled to and drives an oil pump impeller. As will be described below, the oil impeller pistons 202 of the pump rotate in a stepwise manner in chambers 208 of the oil impeller cover 44 to function as a pump to force the lubricant through the various oil channels to lubricate the moving engine parts. The CW counter-rotating oil distributor 52 functions to distribute the oil into the oil channel ports of the cylinder rotor 24 and the hub rotor 26. The stationary inlet/outlet oil manifold 48 provides a ready supply of lubricating oil from the reservoir 232 to and from the CW counter-rotating oil distributor 52. The inlet/outlet oil manifold 48 is connected by hoses to the oil reservoir 232 and the cooling oil radiator 236.

Figure 19:
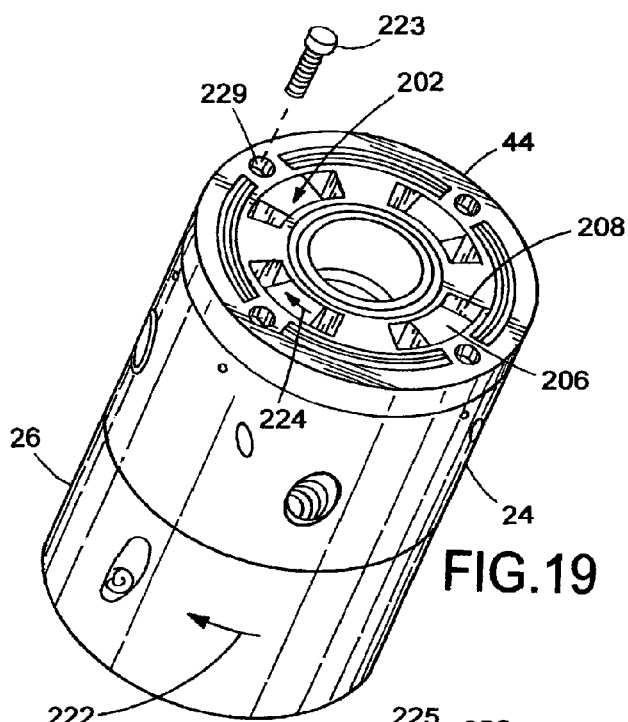
FIG. 19 is an isometric view of the hub rotor, the cylinder rotor and the chambered oil impeller cover.
Figure 20D:
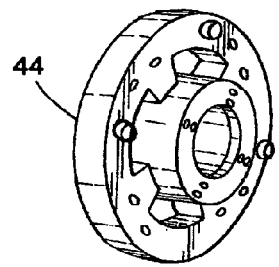
FIGS. 20a-20d are respective isometric left end, left end, side and isometric right end views of the chambered oil impeller cover.
Figure 20B:
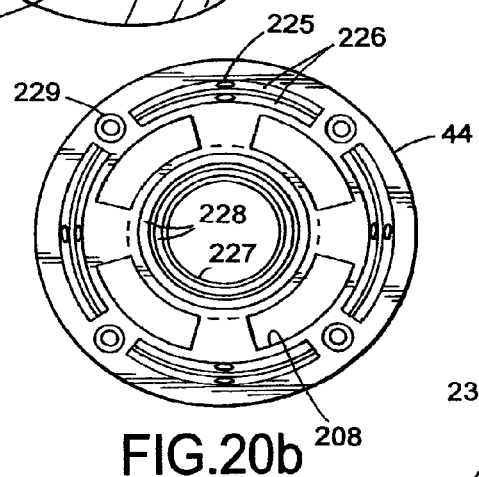
Figure 20C:
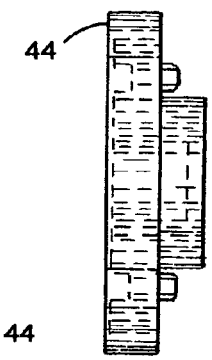
Figure 20A:
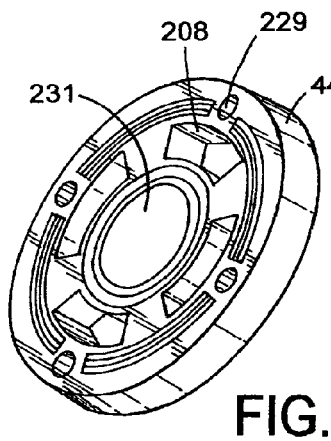

FIGS. 17a and 17b illustrate the cylinder rotor 24 coupled to the hub rotor 26, as described above. The oil impeller 202 is fastened to the hub end 104 of the hub rotor 26 by bolts, screws 204, or the like. The oil impeller 202 includes a number of impeller pistons 206 that rotate within respective chambers 208 formed in the end of the oil impeller cover 44 (FIG. 19). The movement of the four oil pump impeller pistons 206 within the respective four chambers 208 of the oil impeller cover 44 occurs in the same stepwise manner described in connection with the four combustion cycles of the engine 10. In other words, the engine 10 effectively includes two separate sets of pistons and two separate sets of chambers, one set of pistons and chambers to carry out the four-cycle internal combustion engine functions to provide torque to the engine 10, and the other set of pistons and chambers to carry out a lubricant pumping function. However, the oil distribution assembly 200 does not undergo four different cycles as does the internal combustion pistons and cylinders, but rather undergoes only two cycles, namely an oil intake cycle and an oil pump cycle. With regard to the oil distribution assembly or pump 200, rather than carrying out an exhaust cycle, oil is pumped out of the respective decreasing volume chambers 208, and rather than carrying out a mixture intake cycle, the increasing volume of the other chambers draws in the lubricant from the reservoir 232 of oil. Each chamber 208 of the oil distribution assembly 200 is either drawing in the oil or forcing oil out of the respective chambers. Accordingly, only two cycles are employed in the oil distribution assembly 200, even though the pistons and chambers are constructed substantially identical to the combustion pistons and chambers.

Figure 18B:
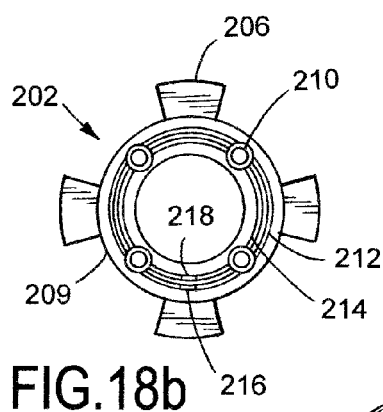
FIGS. 18a-18c are respective isometric, end and side views of the oil impeller.
Figure 18C:
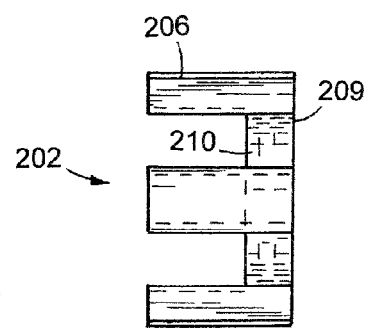
Figure 18A:
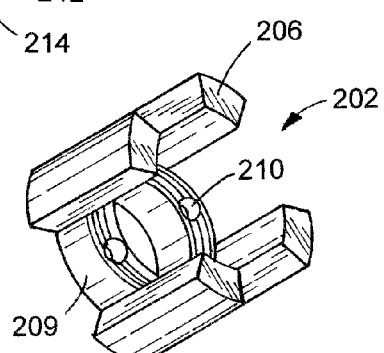

FIGS. 18a-18c show the details of the oil impeller 202. The oil impeller 202 is constructed with four impeller pistons, one shown as numeral 206, mounted to a base 209. As noted above, the oil impeller 202 is fastened to the hub end 104 of the hub rotor 26 by screws 204 that extend through holes 210 formed in the base of the impeller 202 and are threaded into threaded holes formed in the hub end 104. The oil impeller cover 44 is fastened to the cylinder rotor 24. The impeller pistons 206 fit within respective chambers 208 of the oil impeller cover 44 of FIG. 20. The stepwise movement between the oil impeller 202 with the hub rotor 26, in the chambers 208 of the oil impeller cover 44, provides a pump for the lubricant. The stepwise movement between the cylinder rotor 24 and the hub rotor 26 provide corresponding stepwise movements between the impeller pistons 206 within the chambers 208 to increase and decrease the volume of the oil chambers in the oil distribution assembly 200. Oil is thus pulled into the oil distribution assembly 200 and forced out of the oil distribution assembly 200. As will be appreciated, the engine 10 can be utilized as a self-contained fuel operated engine and liquid pump to pump a liquid. The oil pump components can be replicated and added to the engine 10 and coupled to a source of liquid to pump the same under pressure to a destination. In other words, the hub rotor 26 can drive two different impellers, and the cylinder rotor 24 can drive two different cylinder chambers to provide two independent pumps, with one pump pumping the oil for the engine 10 and the other pump for pumping the liquid.

The base 209 of the oil impeller 202 is formed with a pair of concentric annular grooves 212 and 214 on the impeller piston side thereof. Each annular grove 212 and 214 is connected to the opposite side of the base 209 by plural oil ports. One oil port 216 is formed in communication with the outer annular oil groove 212 and through the base 209, and the other oil port 218 is formed in communication with the inner annular groove 214 and through the base 209. Each annular oil groove 212 and 214 is connected to plural such oil ports that extend to the opposite side of the base 209 of the oil impeller 202. The oil ports 216 and 218 are coupled to corresponding annular oil grooves formed in the hub side of the oil impeller 202, and is distributed from the hub end 104 to the four hub rotor pistons 102.

FIG. 19 illustrates the assembly of the hub rotor 26 and the cylinder rotor 24, with the oil impeller cover 44 attached to the end of the cylinder rotor 24. As described above, the oil impeller cover 44 has formed therein four chambers 208 in which a respective oil impeller piston 206 is located. As the hub rotor 26 rotates stepwise in the direction of arrow 222, the impeller pistons 206 move within the chambers 208 of the momentarily stationary oil impeller cover 44, it being realized that the cylinder rotor 24 to which the oil impeller cover 44 is fastened is also momentarily stationary. The movement of the hub rotor 26 is shown by the arrow 222, and the movement of the impeller piston 206 is shown by arrow 224. Four cylinder chambers 208 of the oil impeller cover 44 are thus made smaller in volume to pump oil out of the oil distribution assembly 200, while at the same time four other cylinder chambers 208 are made larger in volume to thereby draw oil into the oil distribution assembly 200 from the oil reservoir 232. It can be appreciated that the oil impeller and the oil cylinder apparatus can be reversed so that the hub rotor 26 drives the oil cylinder apparatus and the cylinder rotor 24 drives the oil impeller.

The oil impeller cover 44 is illustrated in more detail in FIGS. 20a-20d. The oil impeller cover 44 is constructed with a set of outer oil distribution grooves 226 and a set of inner oil distribution grooves 228. The outer set of oil distribution grooves 226 are not continuous, but are interrupted with a bolt hole 229 formed therethrough. A bolt 223 is passed through the hole 229 to fasten the oil impeller cover 44 to the end of the cylinder rotor 24. Each outer oil groove 226 includes a respective through-hole 225 formed through the oil impeller cover 44 from one side to the opposite side. Each inner oil groove 228 also includes a respective through-hole 227 formed through the oil impeller cover 44 from one side to the opposite side. The outer two oil grooves 226 and associated through-holes 225 feed pressurized oil to the channels of the cylinder rotor 24, and the inner four oil grooves 228 and associated through-holes 227 feed pressurized oil to the channels of the hub rotor 26. The chambers 208 of the oil impeller cover 44 are otherwise closed except for inlets and outlets that carry the lubricating oil to an oil radiator 236 and from the oil reservoir 232. One face of the oil impeller cover 44 is bolted against the face end of the cylinder rotor 24, while the other face of the oil impeller cover 44 is held against the counter-rotating oil distributor 52, described below.

Figures 21A, 21B, 21C:
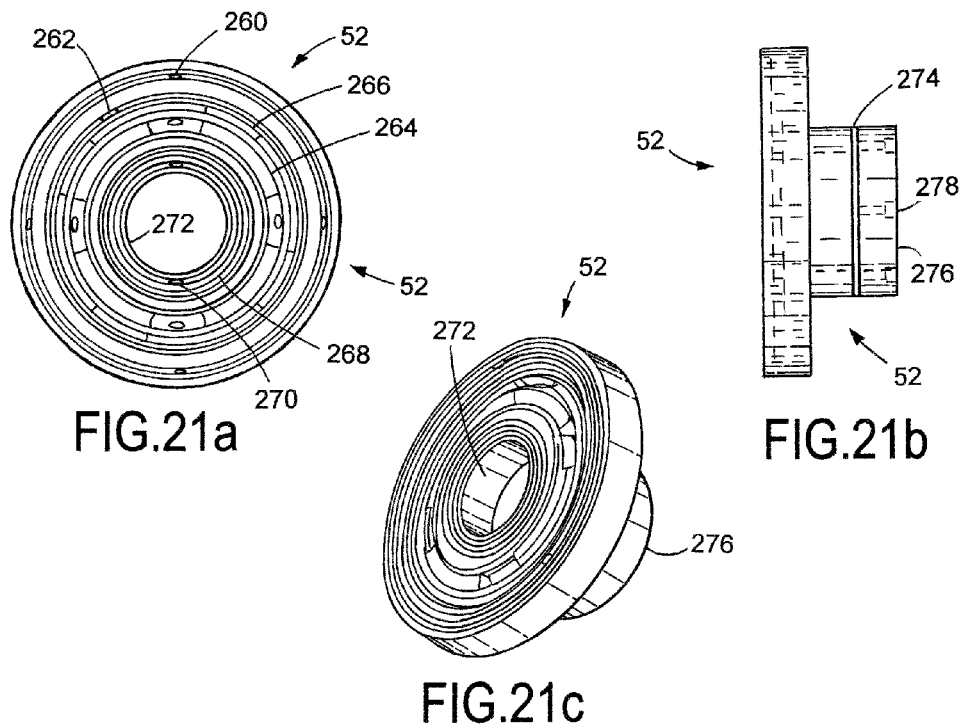
FIGS. 21a-21c are respective end, side and isometric views of the counter-rotating oil distributor.
Figure 22:
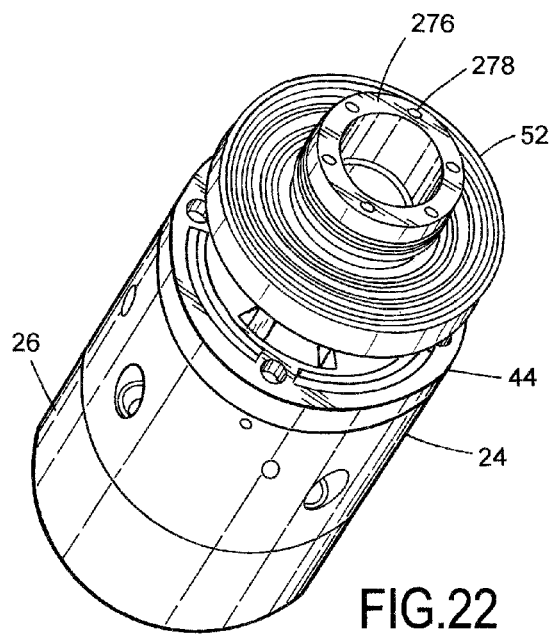
FIG. 22 is an isometric view of the hub rotor, cylinder rotor, and the oil distributor partially removed from the oil impeller cover.

The counter-rotating oil distributor 52 shown in FIG. 21 and FIG. 22 is urged into contact with the face of the oil impeller cover 44 to effectively close the oil impeller cover chambers 208. The function of the oil distributor 52 is to align the ports thereof with the inlet and outlet oil ports of the oil impeller cover 44 while it rotates with the rotors 24 and 26. More specifically, the oil distributor 52 assures that the expanding-volume chambers 208 of the oil distribution assembly 200 draw the oil from the reservoir 232, and the decreasing-volume chambers pressurize the oil and pump it to the cooling radiator 236. From the engine 10, the hot oil is returned to the reservoir 232. To that end, while the cylinder rotor 24 and the oil impeller cover 44 attached thereto rotate in a CCW manner, the oil distributor 52 rotates in a CW direction. Moreover, for every revolution that the cylinder rotor 24 undergoes, the oil distributor 52 undergoes two revolutions. The oil distributor 52 is driven with a set of gears 54 and 56 (FIG. 1) from the main shaft 12 much like that of the fuel mixture/exhaust distributor 60.

The counter-rotating oil distributor 52 is cast and/or otherwise machined from a suitable metal to form the various oil channels therein to distribute oil from the stationary inlet/outlet oil manifold 48 to the oil distribution assembly 200 and then to the cylinder rotor 24 and the hub rotor 26, and then from the cylinder rotor 24 and the hub rotor 26 back to the oil distribution assembly 200 and to the stationary inlet/outlet oil manifold 48. The oil channels in the oil distributor 52 of FIG. 21 include an annular channel in communication with four through-ports 260 which function as an oil out channel from the cylinder rotor 24. A smaller-diameter annular channel and four through-ports 262 are also formed in the face of the oil distributor 52 and function as an oil return into the cylinder rotor 24. Another annular channel and four larger through-ports 264 are formed in the face of the oil distributor 52 and function as an oil intake from the piston chambers 208 of the oil distribution assembly 200. Another annular channel and four large through-ports 266 are formed in the face of the oil distributor 52 and function as an oil outlet from the piston chambers 208 of the oil distribution assembly 200. Near the central bore 272 of the oil distributor 52 is formed an annular channel and four through ports 268 which function as an oil outlet of the hub rotor 26. The smallest diameter annular channel and four through-ports 270 are formed in the face of the oil distributor 52 and function as an oil inlet into the hub rotor 26. As shown in FIG. 21b, an annular groove 274 is formed in a hub portion 276 of the oil distributor 52. The annular oil groove 274 is connected to corresponding internal annular grooves formed in a collar portion 302 of the oil manifold 48. There is an annular elastomeric seal with an annular spring between each of the annular channels of the respective through-ports 260, 262, 264, 266, 268 and 270 to maintain separate oil distribution channels. Lastly, formed in the end of the hub 276 are six threaded holes 278 for bolting thereto the driven gear 56 shown in FIG. 1.

As noted above, the lubricating oil is coupled from and to the cylinder rotor 24 via the two outer annular oil channels corresponding to the respective through-ports 260 and 262. The lubricating oil is coupled from and to the hub rotor 26 via the innermost two annular oil channels of through-ports 268 and 270. The lubricating oil is coupled to and from the oil distribution assembly 200 via the intermediate three oil channels of the through-ports 264, 266 and 268. As noted above, the face of the oil distributor 52 illustrated in FIG. 21a abuts against the face of the oil impeller cover 44 of FIG. 20b, and the opposite face of the oil impeller cover 44 abuts with the outer face of the cylinder rotor 24. FIG. 22 illustrates the oil distribution channels and the through-holes on the face of the oil distributor 52, which face mates with the inlet/outlet manifold 48 of FIG. 23.

Figure 25:
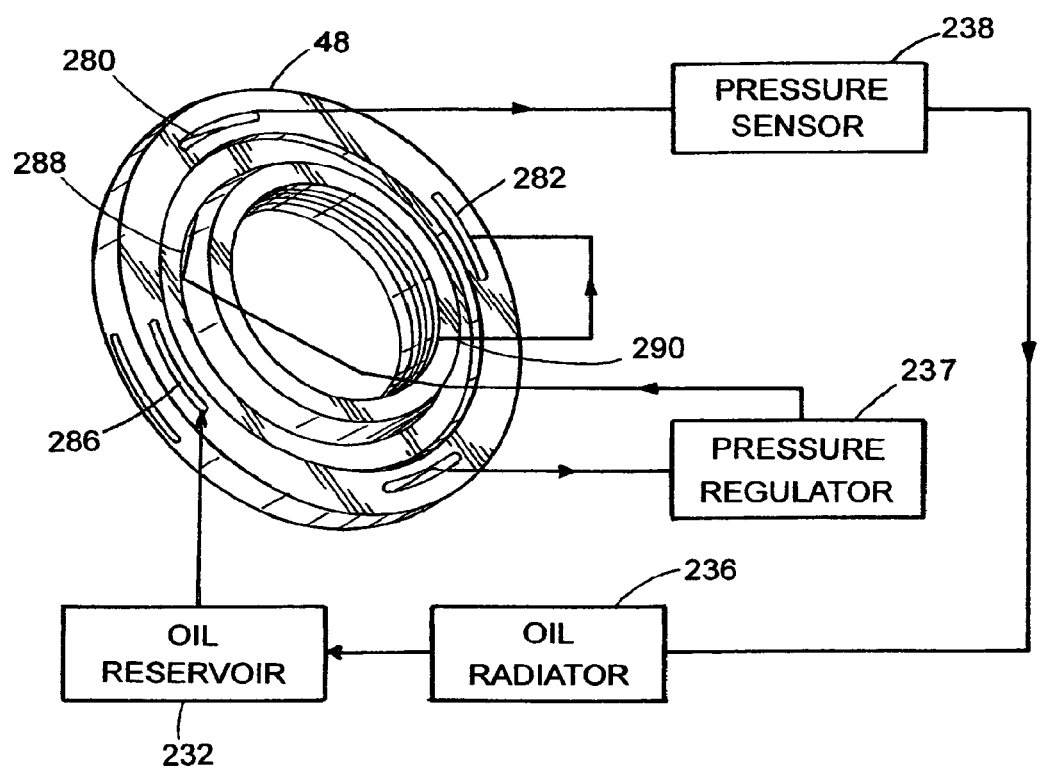
FIG. 25 is a diagram that illustrates the lubrication system that is external to the engine.

The stationary inlet/outlet oil manifold 48 of FIGS. 23a-23d provides an interface between the source of lubricating oil and the counter-rotating oil distributor 52. The inlet/outlet oil manifold 48 is held against the oil distributor 52 by retaining rings to deliver oil to the proper annular grooves thereof. The inlet/outlet oil manifold 48 is fixed and made non-rotatable. While not shown, many of the ports or holes of the inlet/outlet oil manifold 48 are arcuate shaped, as shown in FIG. 25. The holes 280, 282, 284, and 286 in the outer face of the inlet/outlet oil manifold 48 are connected to hoses that couple the lubricating oil to and from the source of the lubricating oil of FIG. 25. The hoses can be connected to the holes 280, 282, 284, and 286 via appropriate coupling fixtures bolted thereto. The hole 280 is coupled from the outer face of the inlet/outlet oil manifold 48 to an annular groove 292 formed on the back face 300 of the inlet/outlet oil manifold 48. The oil circuit of hole 280 couples hot oil from the cylinder rotor 24 to the pressure sensors 238. The hole 282 is coupled from the outer face of the inlet/outlet oil manifold 48 to an annular groove 294 formed on the back face 300 of the inlet/outlet oil manifold 48. The oil circuit of hole 282 provides oil from the output of the hub rotor 26 to the input of the cylinder rotor 24. The hole 284 is coupled from the outer face of the inlet/outlet oil manifold 48 to an annular groove 296 formed on the back face 300 of the inlet/outlet oil manifold 48. The oil circuit of hole 284 provides oil from the impeller pump 200 to the pressure regulator 237. The hole 286 is coupled from the outer face of the inlet/outlet oil manifold 48 to an annular groove 298 formed on the back face 300 of the inlet/outlet oil manifold 48. The oil circuit of hole 286 provides oil from the oil reservoir 232 to the input of the impeller pump 200. The lubricating oil is provided to the hub rotor 26 via the collar hole 288 which extends to an inner annular groove in the collar 302. The oil circuit of collar hole 288 provides oil from the pressure regulator 237 to the input of the hub rotor 26. The lubricating oil is returned from the hub rotor 26 via the collar hole 290 which extends to an inner annular groove 306 in the collar 302. The oil circuit of collar hole 290 returns hot oil from the output of the hub rotor 26 to the input of the cylinder rotor 24. The two inner annular grooves 304 and 306 are isolated by seal rings. In addition, the inner annular grooves 304 and 306 of the collar 302 mate with the outer annular oil grooves 274 formed on the hub 276 of the oil distributor 52.

FIG. 24 illustrates the cylinder rotor end of the engine 10, with the oil distribution components attached to the cylinder rotor 24. The hub rotor 26 drives the impeller pistons 206 within the chambers 208 of the oil impeller cover 44. The counter-rotating oil distributor 52 fits against the face of the oil impeller cover 44, and rotates in a direction opposite that of the oil impeller cover 44. The stationary inlet/outlet oil manifold 48 fits against the outer face of the counter-rotating oil distributor 52. The external arcuate ports of the stationary inlet/outlet oil manifold 48 are coupled by respective hoses to the oil cooling system 230 of FIG. 25.

The lubricating system 230 external to the engine 10 is shown generally in FIG. 25. A supply of lubricating oil is stored in the reservoir 232. From the oil reservoir 232, the lubricating oil flows to the input of the impeller pump 202 where it is pressurized. The oil output from the impeller pump 202 is coupled to the pressure regulator 237, and from the pressure regulator 237 to the input of the hub rotor 26. The oil circulated through the hub rotor 26 then flows out of the oil manifold 48 to the input of the cylinder rotor 24. The lubricating oil then flows out of the cylinder rotor 24 to the pressure sensors 238, and then to the cooling oil radiator 236 where it is cooled. The cooled oil then flows from the radiator 236 to the reservoir 232, where the oil circulation loop is repeated.

The principles and concepts of the engine can also be employed for use as a positive displacement fluid pump. The two rotors together with the fuel inlet and outlet manifold and associated components can be used to input a fluid to the chambers, and pump the fluid out of chambers. The liquid inlet and outlet manifold can be modified by those skilled in the art to provide a liquid to half of the chambers while the other half of the chambers are pressurizing the previously input liquid. Moreover, the two rotors can be driven externally by a motor or engine, or the engine described above can be utilized with the addition of a liquid pump coupled to the lubrication pump, i.e., the internal combustion engine rotors drive impellers of both a lubrication pump and an additional liquid pump.

While the foregoing internal combustion engine has been described with four cylinder rotor pistons and four hub rotor pistons, those skilled in the art can adapt the engine of the invention to use many other different numbers of pistons and cylinders. In addition, the shape of the different components can be varied to a great extent and yet accomplish the features of the invention. Rather than providing a fuel mixture and spark to the chambers of the engine, the spark delivery system can be omitted and a diesel fuel can be utilized instead.

While the preferred and other embodiments of the invention have been disclosed with reference to specific rotating rotor and combustion chamber engine apparatus, and associated methods of operation thereof, it is to be understood that many changes in detail may be made as a matter of engineering choices without departing from the spirit and scope of the invention, as defined by the appended claims.

What is claimed is:
1. An internal combustion engine, comprising:
a main shaft rotatable about an axial axis thereof;
a first rotor rotatably driving said main shaft in only one rotary direction about said axial axis, said first rotor drivingly attached to said main shaft to allow said first rotor to remain stationary while said main shaft is rotated in said one rotary direction, said first rotor having a cylindrical housing, a plurality of first rotor pistons attached internal to said cylindrical housing, the plurality of said first rotor pistons and said cylindrical housing rotate about said axial axis;
a second rotor rotatably driving said main shaft in said only one rotary direction about said axial axis, said second rotor drivingly attached to said main shaft to allow said second rotor to remain stationary while said first rotor rotatably drives said main shaft in the one rotary direction, said second rotor having a cylindrical housing and a plurality of second rotor pistons attached internal to the cylindrical housing of said second rotor, the plurality of said second rotor pistons and the cylindrical housing of said second rotor rotate about said axial axis; and
an oil pump driven by said first rotor and said second rotor;
wherein said main shaft extends axially through said first rotor and said second rotor;
wherein the plurality of said first rotor pistons and the plurality of said second rotor pistons are interdigitated to form chambers therebetween;

wherein said first rotor and said second rotor drive said main shaft in a step-wise manner during rotation of said main shaft, wherein one of said first rotor and said second rotor is momentarily stopped for a period of time while the other rotor is driving said main shaft during the same period of time; and wherein said oil pump draws oil from a reservoir and pumps the oil to components of said internal combustion engine to be lubricated.

2. The internal combustion engine of claim 1, wherein said first rotor pistons extend radially inwardly from an internal surface of said cylindrical housing of the first rotor, and said second rotor pistons extend into said cylindrical housing of the first rotor.

3. The internal combustion engine of claim 1, further including at least one spark plug fastened to and rotatable with said first rotor, and at least one spark plug fastened to and rotatable with said second rotor, said spark plugs each for igniting a fuel mixture in one of said chambers.

4. The internal combustion engine of claim 1, wherein said main shaft extends through said first rotor and said second rotor, and including a first one-way bearing for connecting said first rotor to said main shaft, and including a second one-way bearing for connecting said second rotor to said main shaft, wherein said first one-way bearing locks and allows said first rotor to drive the main shaft, and wherein said second one-way bearing locks and allows said second rotor to drive the main shaft.

5. The internal combustion engine of claim 4, wherein said first one-way bearing is arranged so that said first rotor drives the main shaft a number of degrees in one direction during a first ignition cycle, and wherein said second one-way bearing is arranged so that subsequently said second rotor drives the main shaft a number of degrees in the same direction during a second ignition cycle.

6. The internal combustion engine of claim 1, wherein said oil pump comprises impeller pistons, each said impeller piston moveable within a respective chamber of a chambered member, said impeller pistons and said chambered member rotate in a step-wise manner with said first and second rotors.

7. The internal combustion engine of claim 6, wherein said impeller pistons are driven by said first rotor and said chambered member is driven by said second rotor.

8. The internal combustion engine of claim 1, wherein said oil pump includes impeller pistons, said impeller pistons driven by said first rotor, and said oil pump including a cylinder member driven by said second rotor, the impeller pistons located in respective cylinders of said cylinder member, and including an oil distributor for feeding a source of lubricating oil to said oil pump chambers of said oil pump cylinders that are increasing in volume, and said oil distributor for returning the lubricating oil from oil pump chambers of decreasing volume to oil channels of said first and second rotors.

9. The internal combustion engine of claim 1, wherein the cylindrical housing of said first rotor includes an annular edge, and the cylindrical housing of said second rotor includes an annular edge, and the annular edges of said first cylindrical housing and said second cylindrical housing engage each other with a seal therebetween to seal the chambers.

10. The internal combustion engine of claim 1, wherein said first rotor includes a central hub to which the pistons of said first rotor are attached, at least a portion of said central hub and pistons attached thereto extending into the cylindrical housing of said second rotor.

11. The internal combustion engine of claim 10, further including a spark distributor for sequentially distributing a spark to selected said chambers to sequentially ignite a respective compressed fuel mixture in the selected chambers to cause the first and second rotors to rotate in the step-wise manner.

12. The internal combustion engine of claim 11, further including a fuel mixture and exhaust distributor attached to one end of one said first or second rotor, said fuel mixture and exhaust distributor having ports in communication with the chambers of said first and second said rotors for simultaneously supplying a fuel mixture to specified chambers and extracting exhaust gasses from other selected chambers.

13. The internal combustion engine of claim 12, further including a gear arrangement for rotating said fuel mixture and exhaust distributor in a direction opposite a rotational direction of said first and second rotors.

14. The internal combustion engine of claim 13, wherein said gear arrangement rotates said fuel mixture and exhaust distributor at an angular speed twice an angular speed of either said first rotor or said second rotor.

15. The internal combustion engine of claim 12, further including a stationary fuel mixture and exhaust manifold operating with said fuel mixture and exhaust distributor, a source of a fuel mixture coupled to said stationary fuel mixture and exhaust manifold, and an exhaust pipe coupled to the stationary fuel mixture and exhaust manifold to remove the exhaust gasses from said engine.

16. The internal combustion engine of claim 1, wherein the pistons of said first rotor are each constructed to move in a respective arc segment, where plural arc segments comprise one revolution of said first rotor, and during rotational movement of said first rotor in each said arc segment, said second rotor is momentarily stationary.

17. The internal combustion engine of claim 1, wherein said main shaft is rotatably supported at each end thereof by a respective one-way bearing.

18. An internal combustion engine for driving a load, comprising:

a main shaft for delivering torque to the load, said main shaft rotatable about an axial axis thereof;

a first rotor having pistons and a second rotor having pistons, and chambers of varying volume between the pistons of said first rotor and the pistons of said second rotor, said first and second rotors alternately rotating about said main shaft to change the volume of said chambers, at least one chamber compressing a fuel therein for a combustion cycle to develop the torque to drive the load;

a first one-way rotating mechanism and a second one-way rotating mechanism, each said one-way rotating mechanism allowing rotation in one direction about said axial axis, but locks during attempted rotation in an opposite direction;

wherein said first one-way rotating mechanism connected between said first rotor and said main shaft for driving said main shaft about said axial axis when said first one-way mechanism is in a locked condition;

wherein said second one-way rotating mechanism connected between said second rotor and said main shaft for driving said main shaft about said axial axis when said second one-way mechanism is in a locked condition to rotate said main shaft in the same direction as said first rotor rotates said main shaft;

wherein said main shaft extends axially through said first rotor and through said second rotor; and wherein said first rotor and said second rotor are not rigidly and mechanically fixed to said main shaft so that while said main shaft is rotating at least one of said first rotor and said second rotor remains stationary.

19. The internal combustion engine of claim 18, further including a pair of main supports, each main support for supporting a respective end of said main shaft, said main shaft journaled in each said main support with a respective third and fourth one-way rotating mechanism.

20. The internal combustion engine of claim 18, wherein each said first and second rotors includes a cylindrical housing, and including respective covers covering an end of each said cylindrical housing, each cover rotatably attached to said main shaft with a respective fifth and sixth one-way rotating mechanism.

21. The internal combustion engine of claim 18, wherein said first and second one-way rotating mechanisms comprise one-way bearings.

22. An internal combustion engine, comprising:
a main shaft;
a hub rotor coupled to said main shaft for imparting a torque to said main shaft during first ignition cycles of said engine, said hub rotor having a cylindrical housing attached thereto, said hub rotor including a hub portion having an outer surface that extends centrally into said cylindrical housing and extends beyond an annular edge of said cylindrical housing, said hub rotor further including plural finger-like pistons spaced around and attached to the outer surface of said hub portion, and a portion of each said finger-like piston attached to an inner cylindrical surface of said cylindrical housing;
a cylinder rotor coupled to the main shaft for imparting a torque to said main shaft during second ignition cycles of said engine, said cylinder rotor having a cylindrical housing attached thereto, said cylinder rotor having a plurality of finger-like pistons attached to an inner cylindrical surface of the cylindrical housing of said cylinder rotor, the finger-like pistons of said cylinder rotor extending beyond an annular edge of the cylindrical housing of said cylinder rotor and into the cylinder housing of said hub rotor;
said hub rotor and said cylinder rotor rotatably connected together so that the finger-like pistons of said hub rotor are interleaved with the finger-like pistons of said cylinder rotor to form chambers therebetween, when rotatably connected together the annular edge of the cylindrical housing of said hub rotor sealingly engages with the annular edge of the cylindrical housing of said cylinder rotor; and
each finger-like piston of said hub rotor incrementally rotates about said main shaft between respective adjacent finger-like pistons of said cylinder rotor, and each finger-like piston of said cylinder rotor incrementally rotates about said main shaft between respective adjacent finger-like pistons of said hub rotor.

23. The internal combustion engine of claim 22, wherein the cylindrical housing of said cylinder rotor further includes plural spark plugs attached thereto, and the cylindrical housing of said hub rotor further includes plural spark plugs attached thereto.

24. The internal combustion engine of claim 22, wherein said hub and said cylinder rotors are coupled to said main shaft with respective one-way rotating mechanisms, whereby during an ignition cycle said hub rotor rotates in one angular direction about said main shaft and said cylinder rotor is prevented from rotating in an opposite angular direction about said main shaft, and during a subsequent ignition cycle said cylinder rotor rotates in said one angular direction about said main shaft and said hub rotor is prevented from rotating in the opposite angular direction about said main shaft.

25. An internal combustion engine, comprising:
a rotatable main shaft;
a fuel mixture and exhaust distributor;
a first rotor for rotatably driving said main shaft, said first rotor having a cylindrical-shaped housing, said first rotor having plural pistons extending radially inwardly from an internal surface of said first rotor cylindrical-shaped housing toward an axial axis of the first rotor, said pistons rotating about said axial axis in concert with the cylindrical-shaped housing of said first rotor;
a second rotor for rotatably driving said main shaft, said second rotor having an outer cylindrical-shaped housing and an inner cylindrical-shaped hub, said second rotor having plural pistons extending radially inwardly from an internal surface of the cylindrical-shaped housing of said second rotor to said hub, said second rotor pistons rotating about said second rotor axial axis in concert with the cylindrical-shaped housing of said second rotor;
the pistons of said second rotor extending axially into the cylindrical-shaped housing of said first rotor, and the pistons of said first rotor extending axially into the cylindrical-shaped housing of said second rotor so that the pistons of said first rotor and the pistons of said second rotor are interdigitated;
a plurality of chambers located between the pistons of said first rotor and the pistons of said second rotor, said chambers rotatable with said first and second rotors;
an oil pump having an impeller with pistons, and said oil pump having a cylinder member with cylinders, the pistons of said impeller rotatably movable in respective cylinders of said cylinder member to draw a lubricant therein and to force the lubricant out of said cylinders to lubricate moving components of said engine, said oil pump attached to a first end of said engine and one of said impeller or said cylinder member is connected to and driven in concert by said first rotor, and another of said impeller or said cylinder member is connected to and driven in concert by said second rotor; and
a fuel mixture and exhaust distributor having fuel mixture ports and exhaust ports, said fuel mixture and exhaust distributor attached to a second end of said engine opposite said first end, said fuel mixture and exhaust distributor operable to rotate so that the fuel mixture ports of said fuel mixture and exhaust distributor maintain alignment with chambers of said engine undergoing respective Intake cycles, and said fuel mixture and exhaust distributor operable to rotate so that the exhaust ports of said fuel mixture and exhaust distributor maintain alignment with chambers of said engine undergoing respective Exhaust cycles.

26. The internal combustion engine of claim 25, further including a gear arrangement for rotating said fuel mixture and exhaust distributor in an angular direction opposite that of said main shaft.

27. The internal combustion engine of claim 26, wherein said gear arrangement is constructed for driving said fuel mixture and exhaust distributor with said main shaft so that said fuel mixture and exhaust distributor rotates with an angular rate twice that of either said first rotor or said second rotor.

28. A method of operating an internal combustion engine, comprising:

incrementally driving a first engine rotor by successive IG cycles to incrementally drive a main shaft in a rotary direction, and between said IG cycles allowing the main shaft to rotate in said rotary direction while said first engine rotor does not drive said main shaft;

incrementally driving a second engine rotor between the successive IG cycles of said first engine rotor to incrementally drive said main shaft in said rotary direction, and said second engine rotor allows the main shaft to rotate in said rotary direction while said first engine rotor drives said main shaft and while said second engine rotor does not drive said main shaft;

extending the main shaft through both said first engine rotor and said second engine rotor without rigidly fixing the main shaft to said first engine rotor and said second engine rotor so that during different cycles a) said main shaft is driven in a rotary direction by said first engine rotor while said second engine rotor does not rotate with said main shaft, and b) said main shaft is driven in said rotary direction by said second engine rotor while said first engine rotor does not rotate with said main shaft;

carrying out IN, EX, COMP and IG cycles in different chambers between interdigitated pistons attached to said first and second engine rotors, where a first set of pistons is attached to said first engine rotor and a second set of pistons is attached to said second engine rotor;

incrementally driving the first engine rotor to impart torque to said main shaft during an IG cycle occurring in at least one said chamber, and preventing rotation of said second engine rotor during incremental rotation of said first engine rotor;

incrementally driving the second engine rotor to impart torque to said main shaft during an IG cycle occurring in at least one said chamber and preventing rotation of said first engine rotor during incremental rotation of said second engine rotor; and rotating said main shaft alternately by said first engine rotor and said second engine rotor so that said main shaft rotates at twice an angular rate of rotation of either said first engine rotor or said second engine rotor.

29. The method of operating the internal combustion engine according to claim 28, further including applying a spark to said first and second engine rotors while rotating.

30. The method of operating the internal combustion engine according to claim 28, further including carrying out IN, EX, COMP and IG cycles simultaneously.

31. The method of operating the internal combustion engine according to claim 28, further including driving an impeller of a lubricant pump with the first engine rotor, and driving a cylinder member of the lubricant pump with the second engine rotor.

32. The method of operating the internal combustion engine according to claim 28, further including using one-way bearings for connecting said first engine rotor and said second engine rotor to said main shaft.

33. A method of operating an internal combustion engine, comprising:

incrementally driving a first engine rotor by successive IG cycles to incrementally drive a main shaft in a rotary direction, and between said IG cycles allowing the main shaft to rotate in said rotary direction while said first engine rotor does not drive said main shaft;

incrementally driving a second engine rotor between the successive IG cycles of said first engine rotor to incrementally drive said main shaft in said rotary direction, and said second engine rotor allows the main shaft to rotate in said rotary direction while said first engine rotor drives said main shaft and while said second engine rotor does not drive said main shaft;

carrying out IN, EX, COMP and IG cycles in different chambers between interdigitated pistons attached to said first and second engine rotors, where a first set of pistons is attached to said first engine rotor and a second set of pistons is attached to said second engine rotor;

incrementally driving the first engine rotor to impart torque to said main shaft during an IG cycle occurring in at least one said chamber, and preventing rotation of said second engine rotor during incremental rotation of said first engine rotor;

incrementally driving the second engine rotor to impart torque to said main shaft during an IG cycle occurring in at least one said chamber and preventing rotation of said first engine rotor during incremental rotation of said second engine rotor;

rotating said main shaft alternately by said first engine rotor and said second engine rotor so that said main shaft rotates at twice an angular rate of rotation of either said first engine rotor or said second engine rotor; and driving an impeller of a lubricant pump with the first engine rotor, and driving a cylinder member of the lubricant pump with the second engine rotor.

* * * * *